United States Patent
Brown

(10) Patent No.: US 10,214,229 B2
(45) Date of Patent: Feb. 26, 2019

(54) ULTIMATE CART DOLLY SYSTEMS

(71) Applicant: R. Courtney Brown, Camp Verde, AZ (US)

(72) Inventor: R. Courtney Brown, Camp Verde, AZ (US)

( * ) Notice: Subject to any disclaimer, the term of this patent is extended or adjusted under 35 U.S.C. 154(b) by 477 days.

(21) Appl. No.: 14/833,042

(22) Filed: Aug. 21, 2015

(65) Prior Publication Data

US 2016/0052355 A1     Feb. 25, 2016

Related U.S. Application Data

(60) Provisional application No. 62/070,358, filed on Aug. 21, 2014.

(51) Int. Cl.
| | | |
|---|---|---|
| *B60D 1/06* | (2006.01) | |
| *B62B 3/00* | (2006.01) | |
| *B60D 1/58* | (2006.01) | |
| *B60D 1/00* | (2006.01) | |

(52) U.S. Cl.
CPC ............... *B62B 3/001* (2013.01); *B60D 1/58* (2013.01); *B60D 2001/005* (2013.01); *B60D 2001/006* (2013.01)

(58) Field of Classification Search
CPC .... B62B 3/001; B60D 1/58; B60D 2001/005; B60D 2001/006
USPC .............. 280/511, 476.1, 490.1, 43.1, 47.24
See application file for complete search history.

(56) References Cited

U.S. PATENT DOCUMENTS

| | | | |
|---|---|---|---|
| 2,723,130 A | 11/1955 | Andrews | |
| 3,083,950 A | 4/1963 | Detwieler | |
| 3,189,365 A * | 6/1965 | Blacher | B60D 1/66 280/414.1 |
| 3,622,181 A | 11/1971 | Smith | |
| 4,861,057 A * | 8/1989 | Kunkle | B62B 1/18 280/47.131 |
| 5,071,151 A | 12/1991 | Irwin | |
| 5,343,969 A | 9/1994 | Taylor | |
| 5,449,224 A | 9/1995 | Johnson | |
| 6,024,374 A | 2/2000 | Friesen | |
| 6,328,319 B1 | 12/2001 | Stahler, Sr. | |
| 6,419,244 B2 | 7/2002 | Meabon | |
| 6,663,136 B2 * | 12/2003 | Stevens | B60D 1/075 280/47.27 |
| 6,820,887 B1 | 11/2004 | Riggle | |
| 7,290,782 B2 | 11/2007 | Brown | |
| 7,635,037 B2 | 12/2009 | Treadwell et al. | |
| 7,677,587 B2 * | 3/2010 | Fisk | B60D 1/04 280/443 |
| 7,845,670 B2 * | 12/2010 | Oberg | B60D 1/66 280/47.24 |
| 8,967,651 B1 * | 3/2015 | Simic | B62K 27/003 280/204 |
| 9,308,855 B1 * | 4/2016 | Hancock | B60P 7/0807 |
| 2003/0193156 A1 | 10/2003 | Norris | |
| 2010/0117331 A1 * | 5/2010 | Oberg | B60D 1/66 280/476.1 |
| 2011/0162896 A1 * | 7/2011 | Gillett | B60K 1/04 180/2.2 |

(Continued)

*Primary Examiner* — Jacob D Knutson
(74) *Attorney, Agent, or Firm* — Lodestar Patents, PLLC; Raymond J. E. Hall

(57) ABSTRACT

A cart and dolly system designed to traverse walkways with heavy loads such as air-conditioning units.

14 Claims, 18 Drawing Sheets

(56) References Cited

U.S. PATENT DOCUMENTS

2015/0123361 A1    5/2015  Willett
2015/0321526 A1*  11/2015  Scarth .................... B60D 1/481
                                                  280/457

* cited by examiner

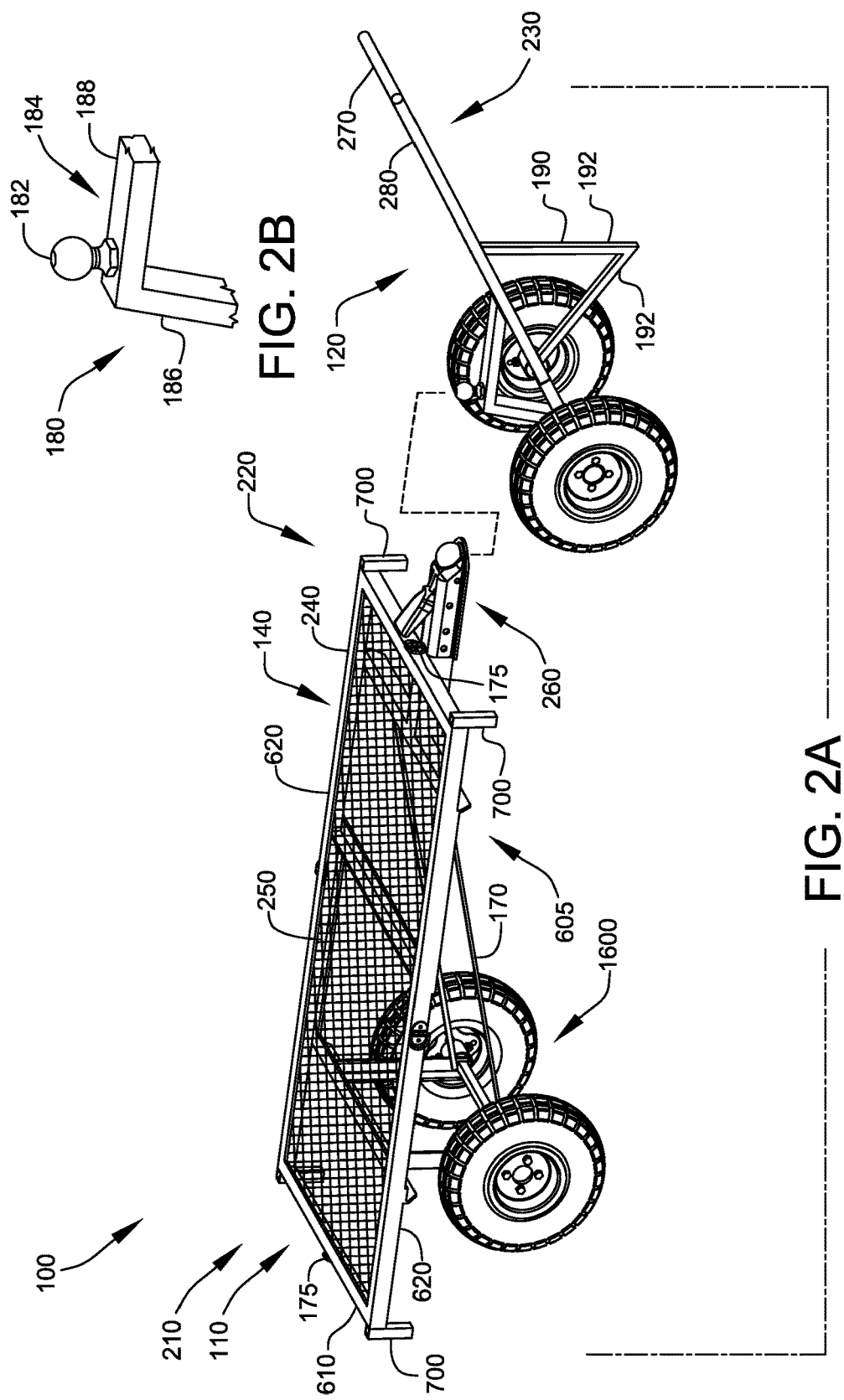

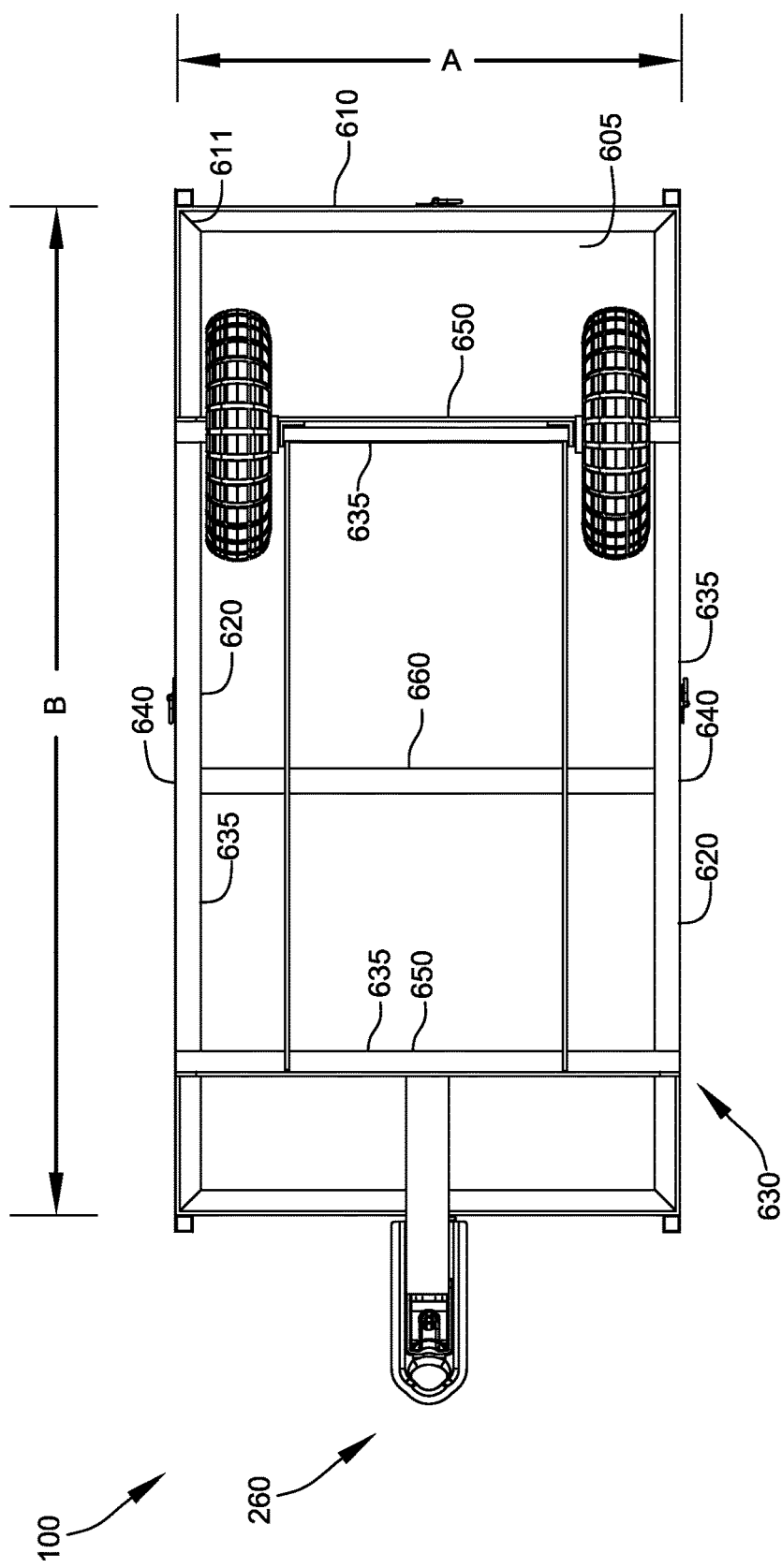

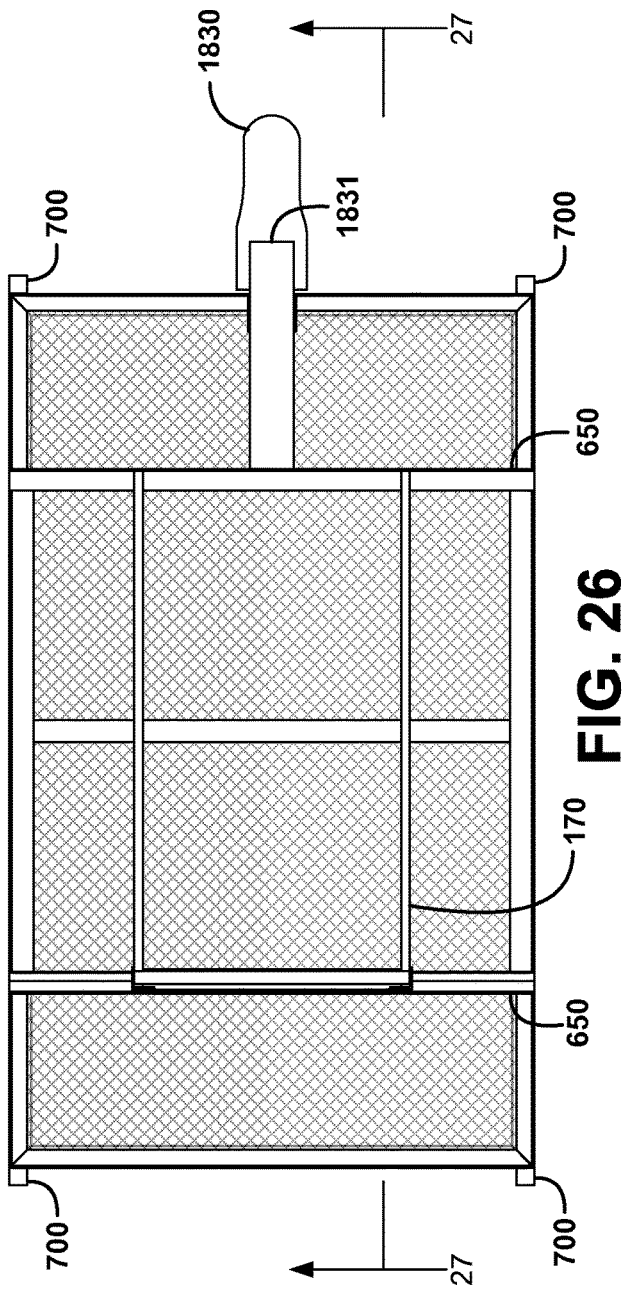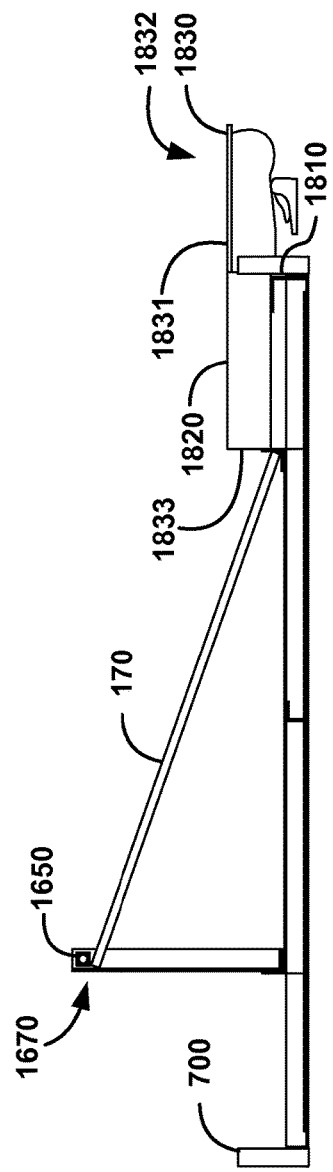

ULTIMATE CART DOLLY SYSTEMS

CROSS-REFERENCE TO RELATED APPLICATION

The present application is related to and claims priority from prior provisional application Ser. No. 62/070,358, filed Aug. 21, 2014, entitled "Ultimate Cart Dolly", the contents of all of which are incorporated herein by this reference and are not admitted to be prior art with respect to the present invention by the mention in this cross-reference section.

BACKGROUND

This invention relates to providing a system for improved ability to move large pieces of equipment across a property or yard or even a rooftop for installation or removal which is sturdy, efficient and strong enough to move such equipment, but yet is compact enough to be able to fit through small openings such as a back yard gate or narrow alley way. More particularly this invention relates to providing a system for a cart and dolly system specifically designed to be strong enough to withstand heavy equipment loads, such as would be placed on it when an HVAC mechanic is installing a new HVAC unit or removing an old unit and replacing it with a new unit.

When an HVAC mechanic needs to either remove an old unit or install a new unit, especially in a residential environment. It is very difficult to transport the old unit out, and bring the new unit in to the area where the unit needs to be installed, because these units are generally located within a backyard enclosure or along a narrow side yard area. These constraints make it difficult to transport the unit or units from the vehicle in which they were transported to the location at which they are to be installed.

Primary problems with other methods of moving these and other large loads from the truck to the installation area is awkward, can be dangerous and would require at least two users to move the equipment safely and efficiently. A commonly used method is use of a dolly, and with a heavy load on two wheels, it can also be difficult if the equipment must be moved over uneven surfaces, where the load becomes somewhat unstable under these circumstances. In commercial environments, the equipment can be located on the roof of a very large building. The equipment is unloaded from the transport vehicle and hoisted onto the roof of the building using a crane, however, the crane may have to be situated at the other end of the building from where the equipment needs to be. Therefore, there is the challenge of moving the equipment from where it is transferred to the roof with the crane to where it needs to be installed. Again, use of a dolly can be difficult, awkward and hazardous due to the uneven surface of the roof as well as the existence of various obstacles in the pathway. A system is needed that allows for the ability to move heavy loads from the transport vehicle to the area where the equipment is needed that is strong and stable enough to handle the load, yet compact enough to fit into relatively small areas.

OBJECTS AND FEATURES OF THE INVENTION

A primary object and feature of the present invention is to provide a system overcoming the above-mentioned problem. More specifically, it is an object and feature of the present invention to provide a system that is strong and stable enough to handle large, heavy loads, yet compact and efficient enough to be able to fit into relatively small areas, and provides the ability to be operated by a single user.

It is a further object and feature of the present invention to provide such a system that is versatile enough to handle a variety of different sized and shaped loads with equal efficiency.

It is a further object and feature of the present invention that may be customized and employed in a wide variety of applications.

Yet another object and feature of the present invention is to provide a system that provides user-selected system adjustability.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a system, relating to transporting equipment through confined walkways while bearing the weight of the equipment, comprising: at least one load support structured and arranged to support the equipment; wherein such at least one load support comprises a front end, a rear end, and an overall-width; and at least one roller structured and arranged to roll such at least one load support over a walkway; wherein such at least one roller comprises at least one front roller and at least one rear roller located respectively near the front end and the rear end of such at least one load support; wherein such at least one front roller and such at least one rear roller comprise a common overall-width; and wherein such common overall-width of such at least one front roller and such at least one rear roller is less than or equal to such overall-width of such at least one load support; and at least one rear mount structured and arranged to mount such at least one rear roller to such at least one load support; and at least one front coupler structured and arranged to removably couple such at least one front roller to such at least one load support; wherein such system bears the weight of the equipment during transport.

Moreover, it provides such a system further comprising at least one handle structured and arranged to permit hand propelling such system. Additionally, it provides such a system wherein such at least one front coupler comprises rotational freedom structured and arranged to rotate in three axes. Also, it provides such a system wherein such at least one front coupler comprises at least one ball-hitch coupler. In addition, it provides such a system wherein such at least one load support and such at least one rear mount collectively comprise at least one loader structured and arranged to assist loading the equipment onto such at least one load support. And, it provides such a system wherein such at least one loader comprises at least one leverage transferer structured and arranged to transfer leverage from the front end to such at least one rear roller. Further, it provides such a system wherein such at least one load support further comprises at least one load tie-down coupler structured and arranged to couple with at least one load tie-down.

Even further, it provides such a system wherein such at least one front roller further comprises at least one trailer mover structured and arranged to assist moving at least one road-trailer structured and arranged to be pulled by at least one road-vehicle. Moreover, it provides such a system further comprising at least one accessory mount structured and arranged to mount at least one accessory structured and arranged to aid such at least one load support in supporting the equipment. Additionally, it provides such a system wherein such at least one accessory mount comprises exactly four accessory mount points. Also, it provides such a system wherein: each such accessory mount point is located at a corner of such at least one load support; two accessory mount points are located on each such front end and such rear end; and each pair of such two accessory mount points comprise a overall-width, including separation, of less than or equal to such overall-width of such at least one load support.

In addition, it provides such a system further comprising at least one side-upright structured and arranged to mount on at least two accessory mount points and enclose at least one side of such at least one load support. And, it provides such a system further comprising at least two of such at least one side-uprights structured and arranged to mount on a common mount point of such at least two mount points and enclose at least two sides of such at least one load support. Further, it provides such a system further comprising such at least one accessory selected from the accessory group consisting of: at least one saddle rack structured and arranged to support at least one saddle; at least one spool support structured and arranged to support a spool of material; and at least one cylinder support structured and arranged to support cylindrical equipment. Even further, it provides such a system further comprising at least one tow rack structured and arranged to rack such at least one load support, such at least one front roller and such at least one rear roller, fully assembled, on at least one tow hitch of at least one road-vehicle.

In accordance with another preferred embodiment hereof, this invention provides a system, relating to transporting equipment through confined walkways while bearing the weight of the equipment, comprising: at least one load support structured and arranged to support the equipment; wherein such at least one load support comprises a platform comprising a front end, a rear end, and an overall-width; and at least one roller structured and arranged to roll such at least one load support over a walkway; wherein such at least one roller comprises at least one axle and at least two wheels; wherein such at least one roller comprises at least one front roller and at least one rear roller located respectively near the front end and the rear end of such at least one load support; wherein such at least one front roller and such at least one rear roller comprise a common overall-width; and wherein such common overall-width of such at least one front roller and such at least one rear roller is less than or equal to such overall-width of such at least one load support; and at least one rear mount structured and arranged to mount such at least one rear roller to such at least one load support; and at least one front coupler structured and arranged to removably couple such at least one front roller to such at least one load support; wherein such at least one front coupler comprises at least one ball-hitch coupler; at least one handle structured and arranged to permit hand propelling such system; wherein such system bears the weight of the equipment during transport.

Even further, it provides such a system wherein such at least one front roller further comprises at least one trailer mover structured and arranged to assist moving at least one road-trailer structured and arranged to be pulled by at least one road-vehicle. Even further, it provides such a system further comprising at least one tow rack structured and arranged to rack such at least one load support, such at least one front roller and such at least one rear roller, fully assembled, on at least one tow hitch of at least one road-vehicle.

In accordance with another preferred embodiment hereof, this invention provides a system, relating to transporting equipment through confined walkways while bearing the weight of the equipment, comprising: load support means for supporting the equipment; wherein such load support means comprises a front end, a rear end, and an overall-width; and roller means for rolling such load support means over a walkway; wherein such roller means comprises front roller means and rear roller means located respectively near the front end and the rear end of such load support means; wherein such front roller means and such rear roller means comprise a common overall-width; and wherein such common overall-width of such front roller means and such rear roller means is less than or equal to the overall-width of such load support means; and rear mount means for mounting such rear roller means to such load support means; and front coupler means for removably coupling front roller means to such load support means; wherein such system bears the weight of the equipment during transport. Even further, it provides such a system wherein such front coupler means comprises rotational freedom means for rotating in three axes. Even further, it provides such a system wherein such load support means and such rear mount means collectively comprise loading means for loading the equipment onto such load support means. Even further, it provides such a system wherein such front roller means further comprises trailer moving means for moving at least one road trailer structured and arranged to be pulled by at least one road vehicle. Even further, it provides such a system further comprising accessory mount means for mounting at least one accessory structured and arranged to aid such load support means in supporting the equipment. And, it provides for each and every novel feature, element, combination, step and/or method disclosed or suggested by this patent application.

BRIEF DESCRIPTION OF THE DRAWINGS

FIG. 2A shows an exploded view, illustrating a preferred cart and dolly, according to the preferred embodiment of FIG. 1.

FIG. 2B shows an enlarged view, illustrating the coupling-riser portion of the dolly, according to the preferred embodiment of FIG. 1.

FIG. 6 shows a plan view illustrating the underside of a preferred embodiment of a cart according to the preferred embodiment of FIG. 1.

FIG. 26 shows a plan view of load-support platform with the coupler and the load-stabilizing reinforcers attached according to the preferred embodiment of FIG. 1.

FIG. 27 shows sectional view 27-27 of FIG. 26.

DETAILED DESCRIPTION OF THE BEST MODES AND PREFERRED EMBODIMENTS OF THE INVENTION

This invention relates to providing a system for improved ability to move large pieces of equipment across a property or yard or even a rooftop for installation or removal which is sturdy, efficient and strong enough to move such equipment, but yet is compact enough to be able to fit through small openings such as a back yard gate or narrow alley way. More particularly this invention relates to providing a system for a cart and dolly system specifically designed to be strong enough to withstand heavy equipment loads, such as would be placed on it when an HVAC mechanic is installing a new HVAC unit or removing an old unit and replacing it with a new unit. For purposes of illustration, the present discussion focuses on application of the system in HVAC installation and removal. However, the system can be used in a variety of residential and commercial trades. There are about as many uses for the system as there are trades.

Primary problems with other methods of transporting heavy equipment or supplies for maintenance, removal or installation of HVAC equipment, involve the need to have the ability to move the equipment or supplies from the transport vehicle to the area of use or installation. Current systems like the use of dollies or wheelbarrows can be awkward, unstable and even hazardous, and generally require at least two users to move the loads. Furthermore, the current systems can become further unstable and difficult to move if the equipment must be moved across an uneven surface, or difficult to employ in some commercial uses if the equipment or supplies must be lifted onto a roof and subsequently moved across the roof to the area of use or installation. This invention has solved these problems with a new cart and dolly system which make it possible for a single user to unload heavy equipment from a transport vehicle onto the cart/dolly and transport it to where it is to be installed or used. Furthermore, the cart and dolly system is specifically constructed for strength and sturdiness while remaining compact enough for a single user to manage it with a load over uneven surfaces, as well as the ability to be lifted onto a roof or other elevated surface for use to transport equipment across the roof or other elevated surface.

Figure 1:
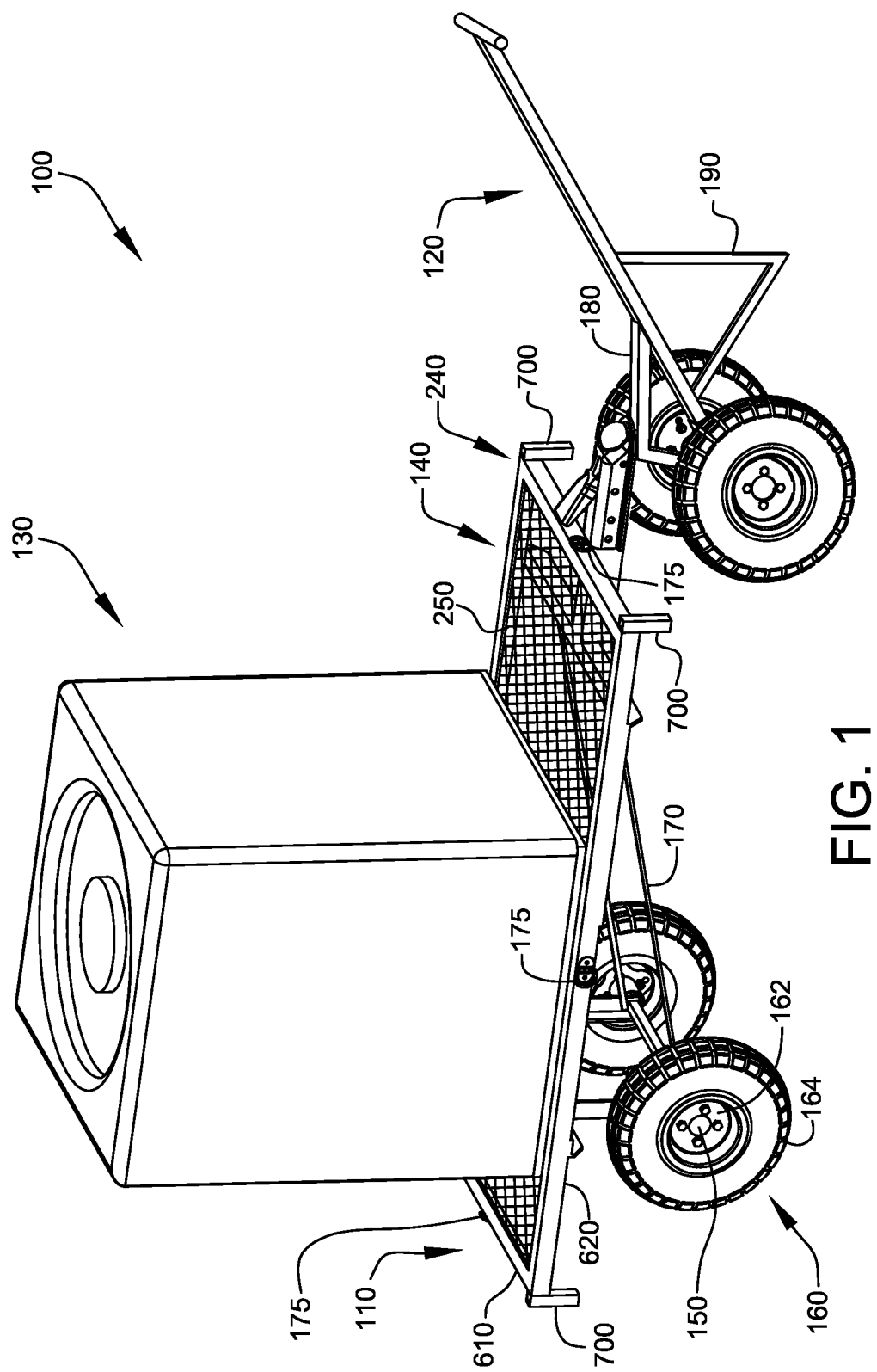
FIG. 1 shows a perspective view illustrating a perspective view of a preferred cart and dolly according to a preferred embodiment of the present invention.

FIG. 1 shows a perspective view illustrating a preferred cart 110 and dolly 120 (at least herein embodying at least one load support structured and arranged to support the equipment; and at least herein embodying wherein such at least one roller comprises at least one front roller and at least one rear roller located respectively near the front and the rear end of such at least one load support; and at least herein embodying wherein such at least one front roller and such at least one rear roller comprise a common overall-width; and at least herein embodying wherein such roller means comprises front roller means and rear roller means located respectively near the front and the rear of such load support means; and at least herein embodying wherein such front roller means and such rear roller means comprise a common overall-width) of ultimate cart dolly system 100 showing heavy equipment 130 loaded on it (HVAC unit) according to a preferred embodiment of the present invention. Ultimate cart dolly system 100 preferably comprises cart 110 (at least herein embodying wherein such at least one load support comprises a front end, a rear end, and an overall width; and at least one roller structured and arranged to roll such at least one load support over a walkway; and at least herein embodying wherein such at least one load support means comprises a front end, a rear end, and an overall width; and at least one roller means for rolling such load support means over a walkway; and at least herein embodying wherein such system bears the weight of the equipment during transport), as shown. Preferably cart 110 comprises metal construction, preferably steel construction, preferably heavy gauge steel construction. Upon reading the teachings of this specification, those skilled in the art will now appreciate that, under appropriate circumstances, considering such issues as design preference, user preferences, marketing preferences, cost, structural requirements, available materials, etc., other materials, such as, for example, brushed steel, stainless steel, aluminum, wood, heavy-duty plastics, etc., may suffice. Cart 110 comprises a load-support platform 140. Load support platform 140 preferably comprises rectangular frame 240 (See FIG. 2A and FIG. 11A-11B). Rectangular frame 240 preferably comprises at least one short side 610 and at least one long side 620, preferably at least two short sides 610 and at least two long sides 620, (See FIG. 6, 11A-11B). Each short side 610 of rectangular frame 240 preferably comprises about 1¼ inch by about 1¼ inch by about ⅛ inch thick angle iron comprising length A of about 30 inches (See FIG. 11A). Each end of each short side 610 is preferably cut at a terminal angle 611 (see FIGS. 11 and 12). Terminal angle 611 preferably comprises an angle of about 45 degrees. Each long side 620 of rectangular frame 240 preferably comprises about 1¼ inch by about 1¼ inch by about ⅛ inch thick angle iron comprising length B of about 50 inches (See FIG. 11A). Each end of each long side 620 is preferably cut at a terminal angle 611. Terminal angle 611 preferably comprises an angle of about 45 degrees. Terminal angle 611 of each short side 610 is preferably welding attached (both inside and outside) to terminal angle 611 of each long side 620 to form rectangular frame 240, as shown.

Load-support platform 140 further comprises support-sheet 250, (See FIG. 2A). Support-sheet 250 preferably comprises mesh sheet, preferably metal mesh sheet, preferably ¾ inch #9 expanded-steel mesh sheet. Upon reading the teachings of this specification, those skilled in the art will now appreciate that, under appropriate circumstances, considering such issues as design preference, user preferences, marketing preferences, cost, structural requirements, available materials, etc., other materials, such as, for example, other sizes of steel mesh, solid steel sheets, wood sheets, heavy duty plastic sheets, aluminum sheets, etc., may suffice. Support-sheet 250 preferably comprises width C of about 28 inches by length D of about 48 inches. Support-sheet 250 is placed inside of rectangular frame 240 with the rough edges facing the upper surface of rectangular frame 240 to form load-support platform 140, as shown. Support-sheet 250 is then welding secured along the interior edges of rectangular frame 240.

FIG. 2A shows an exploded view, illustrating a preferred cart 110 and dolly 120, according to the preferred embodiment of FIG. 1. Preferably, cart 110 comprises loading end 210 and pulling end 220. Pulling end 220 preferably comprises coupler 260 (at least embodying herein at least one front coupler structured and arranged to removably couple such at least one front roller to such at least one load support; and at least embodying herein front coupler means for removably coupling front roller means to such load support means; and at least herein embodying wherein such at least one front coupler comprises rotational freedom structured and arranged to rotate in three axes; and at least herein embodying wherein such at least one front coupler comprises at least one ball-hitch coupler). Coupler 260 preferably comprises coupler-reinforcer 1810 and coupler-extender 1820 (see FIG. 18B). Coupler-reinforcer 1810 preferably comprises at least one about 2 inch by about 2 inch length of angle iron comprising length of about 2¾ inches (See FIG. 27). Coupler-reinforcer 1810 is preferably welding attached, to the underside 605 of load-support platform 140 at the center (or centered at about 15 inches) of short side 610 of load-support platform 140. Coupler-reinforcer 1810 is preferably welding attached with the angle facing to the interior (or toward the loading end 210) of the underside 605 of load-support platform 140 (See FIG. 25). This preferably leaves a portion of coupler-reinforcer 1810 protruding past the bottom edge of short side 610 of the load-support platform 140, which allows for clearance between trailer coupler 1830 and load-support platform 140 (See FIG. 27).

Coupler-extender 1820 preferably comprises a trailer coupler 1830. Trailer coupler 1830 comprises a standard-trailer coupler comprising a standard 2 inch ball receiver (See FIG. 27). Coupler-extender 1820 preferably further comprises at least one about 2½ inch by about 2½ inch hammered square tube comprising length of about 13 inches. One end 1831 of coupler-extender 1820 is preferably welding attached to the open end of trailer coupler 1830 opposite the 2 inch ball receiver 1832. Coupler-extender 1820 slides into trailer coupler 1830 to a distance not exceeding 3 inches. The other end 1833 (end opposite the standard trailer coupler 1830) of coupler-extender 1820 is preferably welding attached to the center of the terminally-angled side 650 of the reinforcing-support structure 630 which is located about 10 inches from the pulling end 220 of frame 240; and coupler-extender 1820 is preferably welding attached, at the top of trailer coupler 1830, to the protruding portion of coupler-reinforcer 1810 (See FIG. 27).

Loading end 210 preferably comprises load-stabilizing axle 1600 (at least embodying herein at least one rear mount structured and arranged to mount such at least one rear roller to such at least one load support; and at least embodying herein rear mount means for mounting such rear roller means to such load support means) structured and arranged to allow the ability to carry heavy loads while maintaining the ability to navigate a variety of terrain and surfaces. Load-stabilizing axle 1600 preferably comprises load-stabilizing axle frame 1610 (See FIG. 20). Load-stabilizing axle frame 1610 preferably comprises rectangular frame structure 1620 and axle assembly 1630 (See FIG. 20). Axle assembly 1630 preferably comprises axle 1640 and axle sheath 1650 (See FIG. 20). Axle assembly 1630 preferably comprises about ⅝ inch rolled-steel rod comprising length I of about 30 inches. Axle assembly 1630 preferably further comprises wheel-lock receiver 1635. Wheel-lock receiver 1635 comprises about 9/64 inch hole drilled at each end of axle assembly 1630 structured and arranged to receive a wheel-securing lock 150 (See FIG. 1). Load-stabilizing axle sheath 1650 preferably comprises about ¾ inch by about ¾ inch hammered square tube preferably comprising length J of about 16 inches.

Rectangular frame structure 1620 preferably comprises at least one vertical-frame support 1660, preferably at least two vertical-frame supports 1660, preferably a left vertical-frame support 1661 and a right vertical-frame support 1662, which are mirror images of each other (See FIG. 16A). Left vertical-frame support 1661 preferably comprises about 1¼ inch by about 1¼ inch angle iron comprising a length K of about 12 inches. Left vertical-frame support 1661 preferably further comprises one terminally-angled end 611 comprising about 45 degree angled cut, and one terminally-square end 612 comprising a square cut. Right vertical-frame support 1662 preferably comprises about 1¼ inch by about 1¼ inch angle iron comprising length K of about 12 inches. Right vertical-frame support 1662 preferably further comprises one terminally-angled end 611 (opposite end as Left vertical-frame support 1661) comprising about 45 degree angled cut, and one terminally-square end 612 (opposite end as left vertical-frame support 1661) comprising a square cut. Each vertical-frame support 1660 preferably further comprises axle-assembly receiver 1670 (See FIG. 20) comprising an about 1 inch hole drilled in the angle iron at the terminally-square end.

Load-stabilizing axle frame 1610 further preferably comprises horizontal-frame support 1680. Horizontal-frame support 1680 comprises about 1¼ inch by 1¼ inch angle iron comprising length L of about 16 inches. Horizontal-frame support 1680 preferably further comprises at least one terminally-angled end 611, preferably at least two terminally-angled ends 611. Terminally-angled ends 611 preferably comprise about 45 degree angled cuts. The angled cuts of terminally-angled ends 611 of horizontal-frame support are cut at opposite angles from each other (See FIG. 20). Terminally-angled end 611 of each vertical-frame support 1660 is preferably welding attached to one terminally-angled end 611 of horizontal-frame support 1680 to form a U-shaped load-stabilizing axle frame 1610 (See FIG. 20).

Figure 19:
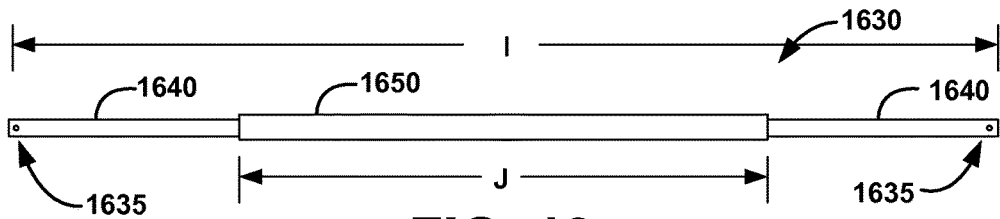
FIG. 19 shows a plan view of the axle assembly according to the preferred embodiment of FIG. 1.

Axle 1640 is placed inside axle sheath 1650 and centered inside the about 16 inches of axle sheath 1650 such that about 7 inches of axle 1640 protrudes from each end of axle sheath 1650 (See FIG. 19). Axle 1640 is preferably welding secured to the inside of axle sheath 1650 at the ends of axle sheath 1650. Axle sheath 1650 containing secured axle 1640 is placed through the axle-assembly receivers 1670 of both left vertical-frame support 1661 and right vertical-frame support 1662, such that the ends of axle sheath 1650 terminate at the vertical-frame supports 1660 and axle 1640 protrudes outward from load-stabilizing axle frame 1610 about 7 inches on each side, forming rectangular load-stabilizing axle frame structure 1620. Rectangular load-stabilizing axle frame structure 1620 is welding attached to the underside 605 of load-support platform 140, centered on side of reinforcing-support structure 630 that is about 10 inches from the edge of the loading end 110 of load-support platform 140 opposite the trailer-coupler 1830 (See FIG. 21).

Preferably, cart 110 further comprises at least one wheel 160, preferably at least two wheels 160. Wheel 160 preferably comprises axle-receiver rim 162, preferably metal axle-receiver rim 162, preferably steel axle-receiver rim 162. Wheel 160 preferably further comprises flat free tire 164, preferably all terrain flat free tire 164, preferably about 15½ inch by about 4¾ inch flat free tire 164, as shown. Upon reading the teachings of this specification, those skilled in the art will now appreciate that, under appropriate circumstances, considering such issues as design preference, user preferences, marketing preferences, cost, structural requirements, available materials, etc., other materials, such as, for example, any other type of flat free wheel and tire, heavy duty plastic wheels, wood wheels, etc., may suffice. Preferably, the at least two wheels 160 of cart 110 are attached to the load-stabilizing axle 1640 through the axle-receiver rim 162. Preferably, axle assembly 1630 further comprises wheel-securing lock 150. Preferably wheel-securing lock 150 comprises cotter pin, preferably split pin cotter pin, preferably about 3/32 inch by 1½ inch split pin cotter pin. Upon reading the teachings of this specification, those skilled in the art will now appreciate that, under appropriate circumstances, considering such issues as design preference, user preferences, marketing preferences, cost, structural requirements, available materials, etc., other materials, such as, for example, any other type of cotter pin, locking snap, locking carabineer, pad lock etc., may suffice. Wheels 160 are secured to load-stabilizing axle 1600 by insertion of wheel-securing lock 150 through wheel-lock receiver 1635 on axle assembly 1630 (See FIG. 1).

Preferably cart 110 further comprises at least one load-stabilizing-reinforcer 170, preferably at least two load-stabilizing-reinforcers 170, structured and arranged to aid in further strengthening and stabilizing the cart 110 when it is loaded with heavy equipment 130. Load-stabilizing-reinforcers 170 preferably comprise about ½ inch by ½ inch hammered square steel tubing comprising length of about 31½ inches. One end of each load-stabilizing-reinforcer 170 is welding attached to the load-stabilizing axle sheath 1650, just inside of the angle of each vertical-frame support 1660. The other end of each load-stabilizing-reinforcer 170 is welding attached to the inside of the angle on the about 30 inch side of the reinforcing-support structure 1620 at the pulling end 220 of the cart 110, as shown (See also FIGS. 26 and 27).

Preferably, cart 110 of ultimate cart dolly system 100 further comprises at least one lashing-receiver 175 structured and arranged to allow a user to lash or tie down (at least herein embodying wherein such at least one load support further comprises at least one load tie-down coupler structured and arranged to couple with at least one load tie-down) equipment 130 which is loaded onto cart 110 to prevent the equipment 130 from shifting or falling off of cart 110 as the load is being transported from the transport vehicle to the area of use or installation. The preferred embodiment of the cart 110 comprises at least four lashing-receivers 175. Lashing-receiver 175 preferably comprises tie down anchors, preferably surface mount tie down anchors, preferably 300 lb test surface mount tie down anchors. Upon reading the teachings of this specification, those skilled in the art will now appreciate that, under appropriate circumstances, considering such issues as design preference, user preferences, marketing preferences, cost, structural requirements, available materials, etc., other materials, such as, for example, tie down holes, boat tie hooks, other types of hooks, etc., may suffice. The preferred embodiment of the cart 110 comprises at least one lashing-receiver 175 located at the center of each side of load-support platform 140, as shown.

FIG. 2B shows an enlarged view, illustrating the coupling-riser 180 portion of dolly 120, according to the preferred embodiment of FIG. 1. Preferably, ultimate cart dolly system 100 further comprises dolly 120. Dolly 120 preferably comprises metal construction, preferably steel construction, preferably heavy gauge steel construction. Dolly 120 preferably comprises load-stabilizing axle 1600. Preferably load-stabilizing axle 1600 comprises axle assembly 1630 which is identical to the axle assembly 1630 of cart 110.

Preferably dolly 120 comprises handler 230 (at least herein embodying at least one handle structured and arranged to permit hand propelling such system; and at least herein embodying wherein such at least one front roller further comprises at least one trailer-mover structured and arranged to assist in moving at least one road trailer structured and arranged to be pulled by at least one road vehicle;

and at least herein embodying wherein such front roller means further comprises moving means for moving at least one road trailer structured and arranged to be pulled by at least one road vehicle). Handler 230 preferably comprises handle 270, arm 280, arm-attacher 290 (See FIG. 19D). Arm 280 preferably comprises about 2 inch by about 1 inch rectangular hammered steel tube comprising a length of about 40 inches, as shown. One end of arm comprises axle end 295. Preferably, axle end 295 comprises arm-attacher 290 comprising U-track which is preferably welding attached to the axle end 295 of arm 280, as shown. Arm-attacher 290 preferably comprises about 1¼ inch by about 2 inch U-track comprising about 5 inch length. The axle end 295 of arm 280 is inserted into arm-attacher 290 (See FIG. 28) to a position such that arm-attacher 290 protrudes outward from arm 280 by a distance of about two inches (See FIG. 29). The portion of arm-attacher 290, which protrudes out from arm 280, forms axle-track 297 (See FIG. 29). Load-stabilizing axle 1600 is inserted through axle-track 297 at the end of arm 280, centered and welding secured into place (See FIG. 30). Preferably, dolly 120 further comprises at least one wheel 160, preferably at least two wheels 160. Wheels 160 which are identical to the wheels 160 of cart 110 are attached to axle assembly 1630 in the same manner as the wheels 160 of cart 110 and locked into place on the axle with wheel-securing lock 150.

Preferably the other end of arm, opposite axle end 295, comprises handle end 265. Handle end 265 preferably comprises handle 270. Handle 270 preferably comprises metal conduit, preferably steel conduit, preferably about ¾ inch round steel conduit comprising a length of about 12 inches. Preferably, handle 270 is centered and welding attached to the handle end 265 of arm 280. Preferably, handle further comprises handle covers 272, preferably rubber covers, preferably standard rubber bicycle handles attached to handle on each side of arm (see FIG. 31).

Preferably, dolly 120 further comprises coupling-riser 180. Coupling-riser 180 is structured and arranged to allow cart to be coupling attached to dolly 120 in such a manner that cart 110 is level with the ground or other surface in relation to dolly 120. Coupling riser 180 preferably comprises coupler platform 184 and coupler ball 182. Coupler platform 184 preferably comprises at least one vertical platform-side 186 and at least one horizontal platform-side 188. Vertical platform-side 186 and horizontal platform side 188 preferably comprise about 2 inch by 1 inch hammered steel rectangular tube comprising a length of about 19½ inches. Vertical platform-side 186 and horizontal platform-side 188 are welding attached to each other at one end forming an angle of about 104 degrees on coupler platform 184. The other end of vertical platform-side 186 is welding attached to arm 280 and axle assembly 1630 at the arm-attacher 290. The other end of horizontal platform-side 188 is welding attached to arm 280 such that it meets arm 280 at an angle of about 30 degrees. Preferably, coupler ball 182 comprises trailer ball, preferably standard 2 inch trailer ball. Preferably coupler ball 182 is bolted to the top of horizontal platform-side 188 at the edge of horizontal platform-side 188 opposite the end that is attached to arm 280, as shown.

Dolly 120 preferably further comprises rest 190. Rest 190 is structured and arranged to allow dolly 120 to stably rest on the ground or other surface in an upright position such that the handle 120 is not lying on the ground. Preferably, rest 190 comprises metal construction, preferably metal tube, preferably hammered square tube, preferably about ¾ inch by about ¾ inch hammered square tube comprising a length of about 14 inches. Preferably, rest 190 comprises at least one rest-side 192, preferably at least two rest sides 192, as shown. Each rest side 192 is angled at one end and welding attached to the other rest side forming a triangular rest 190. One end of the triangular rest 190 is welding attached to the bottom center of axle assembly 1630 at about three inches from the arm-attacher 290. The other end of triangular rest 190 is welding attached to the underside of arm 280 such that it meets arm 280 at a position that is a distance of about 22 inches from the handle end 265 of arm 280, as shown.

Figure 3:
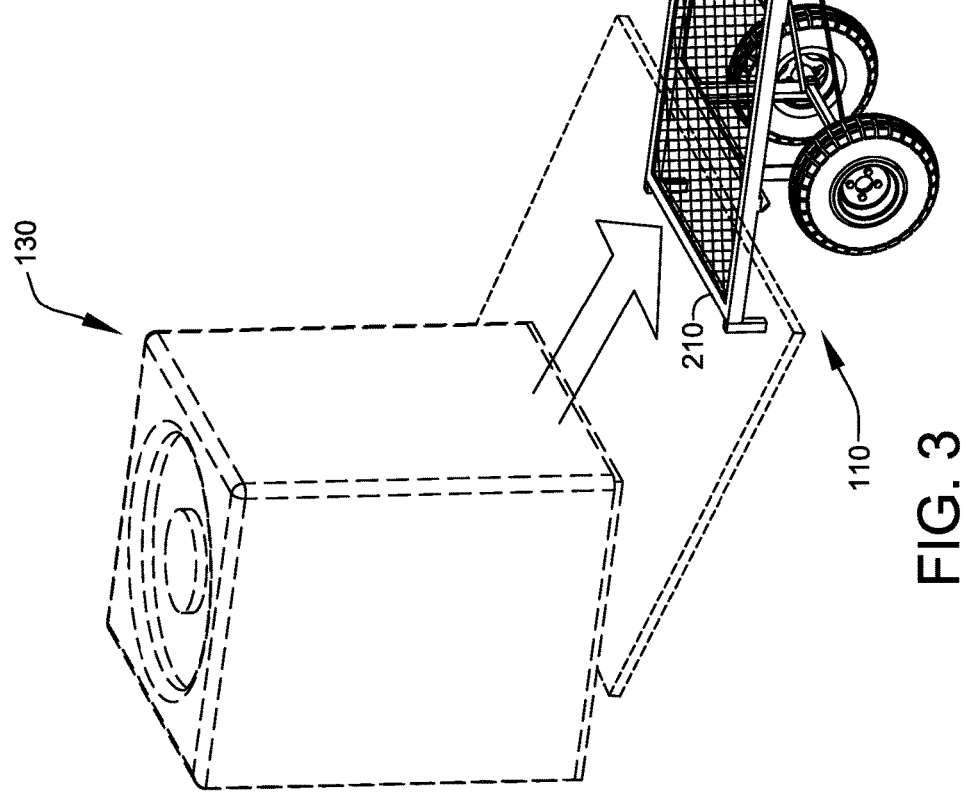
FIG. 3 shows a perspective view, illustrating a preferred cart and dolly in a horizontal loading configuration, according to the preferred embodiment of FIG. 2.

FIG. 3 shows a perspective view, illustrating a preferred cart 110 and dolly 120 in a horizontal loading configuration, according to the preferred embodiment of FIG. 2. FIG. 3 depicts an illustration of how cart 110 and dolly 120 of ultimate cart dolly system 100 can be used in order for the heavy equipment 130 to be unloaded from the transport vehicle and onto cart 110 (at least herein embodying wherein such at least one load support and such at least one rear mount collectively comprise at least one loader structured and arranged to assist loading the equipment onto such at least one load support). Cart 110 with dolly 120 attached are preferably backed up (with loading end 210 nearest the transport vehicle) to the back of the transport vehicle. The loading ramp of the transport vehicle is preferably lowered onto the loading end 210 of load-support platform 140 such that the ramp is preferably centered atop the load-support platform 140, as shown. This creates a "bridge" across which the heavy equipment 130 (in this case an HVAC unit is depicted) can easily be slid across the ramp and onto the load-support platform 140 of cart 110, as shown. The preferred embodiment of ultimate cart dolly system 100 is structured and arranged to be sturdy enough and compact enough that this can be done by a single user efficiently and with relatively little effort.

Once the heavy equipment 130 is loaded onto the load-support platform 140, it can preferably be centered along the length of load-support platform 140 and preferably secured to cart 110 using straps to tie the equipment 130 to the lashing-receivers 175. Once secure the transport vehicle's ramp can be raised off of cart 110, and cart 110 and dolly 120 can preferably then be pulled to the area of installation or use. At the area of installation or use the heavy equipment 130 can be efficiently and easily unloaded from cart 110 by preferably uncoupling dolly 120 from cart 110, which acts to remove the front wheels from cart 110, (not shown). As such, pulling end of cart 110 can preferably be lowered down such that trailer-coupler 1830 rests on the ground. This results in cart 110 becoming a ramp with which the heavy equipment 130 can be slid down onto the ground or other surface and off of cart 110 (not shown).

Figure 4:
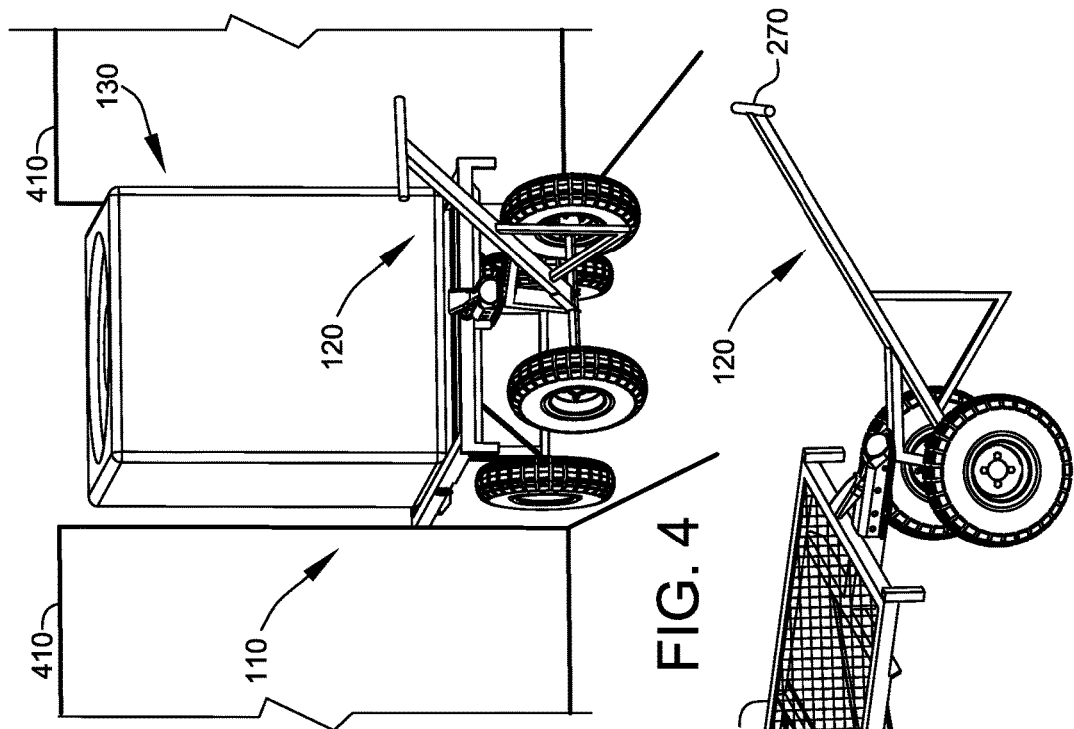
FIG. 4 shows a front elevational view of the preferred embodiment of a loaded cart and dolly in use passing through a small opening, according to the preferred embodiment of FIG. 1.

FIG. 4 shows a front elevational view of the preferred embodiment of a loaded cart 110 and dolly 120 in use passing through a small opening 410 (similar to a garden gate), according to the preferred embodiment of FIG. 1. FIG. 4 depicts how use of ultimate cart dolly system 100 allows for a user to move heavy equipment 130 safely, effectively and easily through narrow spaces like a garden gate, as shown. The preferred embodiment of cart 110 and dolly 120 of ultimate cart dolly system 100 are preferably specifically structured with an about 30 inch width allowing them to be compact enough to fit through small openings 410 like a garden gate or through a narrow alley, as shown. Additionally, the width of load-stabilizing axles 1600 on both cart 110 and dolly 120 is specifically structured with an about 30 inch width allowing the wheels 160 to fit underneath load-support platform 140 without protruding outside the width of load-support platform 140, thereby adding no additional width to cart 110 and dolly 120, as shown (at least herein embodying wherein such common overall-width of such at least one front roller and such at least one rear roller is less than or equal to such overall-width of such at least one load support; and at least herein embodying wherein such common overall width of such front roller means and such rear roller means is less than or equal to the overall-width of such load support means). Furthermore, mount-receivers 700 are preferably specifically placed such that there is no added width to cart 110 and dolly 120 due to the addition of side-panels or accessories, as shown.

Figure 5:
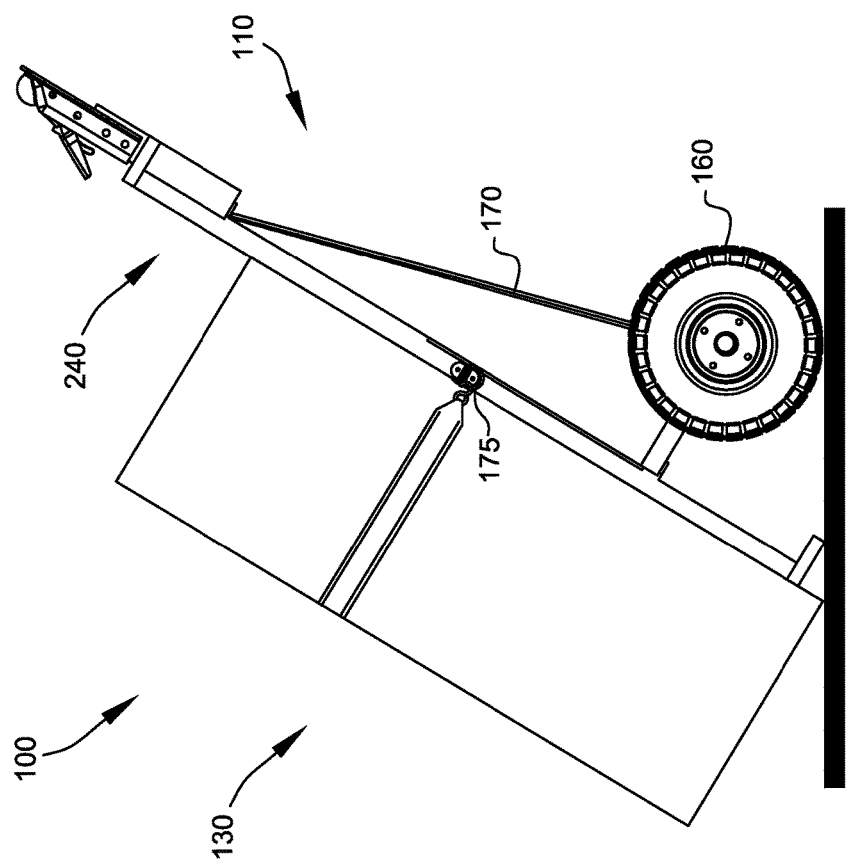
FIG. 5 shows a perspective view of a preferred embodiment of a cart and dolly in a vertical loading configuration according to the preferred embodiment of FIG. 1.

FIG. 5 shows a perspective view of a preferred embodiment of a cart 110 and dolly 120 in a vertical loading configuration according to the preferred embodiment of FIG. 1. Sometimes a user may be moving a piece of equipment 130 which for some reason cannot be placed in a horizontal position or is too difficult to slide onto cart 110. FIG. 5 depicts how such a piece of equipment 130 can be loaded onto and secured to cart 110 in a vertical position. To do this, cart 110 is preferably removed from dolly 120, tipped upward into a vertical orientation, such that the short side 610 of the loading end 210 rests on the ground or other surface and coupler 260 is pointing upward into the air, as shown. Cart 110 is then preferably placed adjacent to the heavy equipment 130 that is to be moved (in this case a hot water heater is depicted), such that load-support platform 140 preferably directly abuts the heavy equipment 130. The heavy equipment 130 is preferably secured to cart 110 by a user, using straps to tie the equipment to the lashing-receivers 175, as shown. Once the equipment 130 is secured to cart 110, a user can preferably use the load-stabilizing-reinforcers 170 as a leverage point (at least herein embodying wherein such at least one loader comprises at least one leverage transferer structured and arranged to transfer leverage from the front end to such at least one rear roller) to pull downward on cart 110 and tip it back down onto its wheels 160 and reattach cart 110 to dolly 120 (not shown).

FIG. 6 shows a plan view illustrating the underside of a preferred embodiment of a cart according to the preferred embodiment of FIG. 1. Preferably, load-support platform 140 comprises reinforcing-support structure 630 attached to the underside 605 of load-support platform 140, as shown. Reinforcing-support structure 630 preferably comprises at least one reinforcing-support side 635, preferably at least four reinforcing-support sides 635, preferably at least two terminally-square-end sides 640 and at least two terminally-angled sides 650, as shown. Reinforcing-support structure 630 preferably further comprises at least one central-reinforcing-support side 660, as shown. Each reinforcing-support side 635 of the at least four sides preferably comprises about ⅛ inch thick by about 1¼ inch by about 1¼ inch angle iron. Central-reinforcing-support side 660 preferably comprises about ⅛ inch thick by about 1 inch by 1⅛ inch angle iron. Each terminally-angled-end side 650 preferably comprises terminal angle 611 at each end, preferably about 45 degree angle, as shown. Each terminally-square end side 640 preferably comprises a square end on each side. Each terminally-angled-end side 650 preferably comprises length of about 30 inches, and each terminally-square-end side 640 preferably comprises length of about 30 inches. Central-reinforcing-support side 660 comprises length of about 29¾ inches, as shown.

Each terminally-square-end side 640 is preferably welding attached to the underside of each long side 620 of load-support platform 140 (with the angle side facing into the underside 605 of load-support platform 140), at a location such that each end of terminally-square-end side 640 is about 10 inches from the end of long side 620 of load-support platform 140, as shown. Each terminally-angled side 650 is preferably attached perpendicularly to the underside 605 of load-support platform 140 at the ends of the terminally-square-end sides 640 with the angled sides facing away from the underside 605 of the load-support platform 140, as shown. Additionally, central-reinforcing-support side 660 is preferably perpendicularly attached to the underside 605 of load-support platform 140 between the long sides 620 of load-support platform 140, at a location which is in the center (or centered at about 25 inches) of the about 50 inch length of long sides 620 of load-support platform 140, as shown. All adjacent edges of reinforcing-support structure 630 sides are preferably welded together and reinforcing-support structure 630 is preferably welded to the underside 605 of load-support platform 140, as shown.

Figure 7:
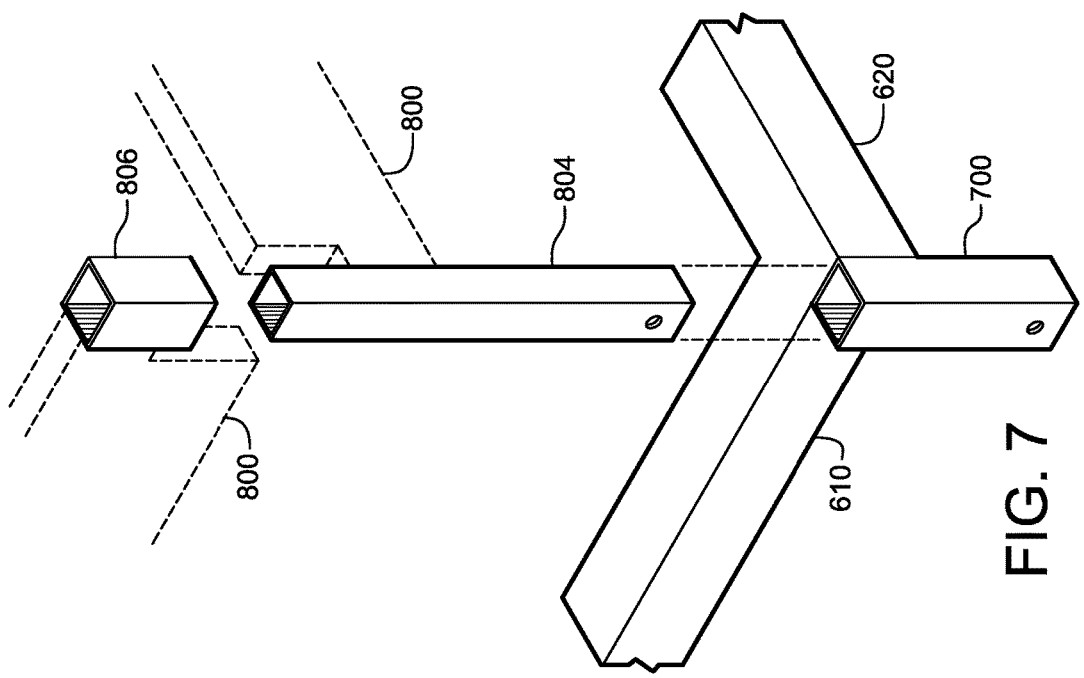
FIG. 7 shows an exploded view illustrating the interlacing sides of the cart according to the preferred embodiment of FIG. 1.

FIG. 7 shows an exploded view illustrating the interlacing sides of the cart according to the preferred embodiment of FIG. 1. Preferably, cart 110 of ultimate cart dolly system 100 preferably further comprises at least one mount receiver 700, preferably at least four mount receivers 700, structured and arranged to allow receiving the mounts of accessories (at least embodying herein at least one accessory mount structured and arranged to mount at least one accessory structured and arranged to aid such at least one load support in supporting the equipment; and at least herein embodying wherein such at least one accessory mount comprises exactly four accessory mount points), as shown. Mount receiver 700 preferably comprises about 1 inch by about 1 inch hammered-square tubing comprising length of about 4 inches. Each mount receiver is welding attached to each terminal edge of the short side 610 of rectangular-frame 240 of load-support platform 140, at the corner junction with the long sides 620, as shown. Mount receivers 700 are specifically attached to the corners of the short sides 610 (at least herein embodying wherein each such accessory mount point is located at a corner of such at least one load support; two accessory mount points are located on each such front and such rear end; and each pair of such two accessory mount points comprise an overall-width, including separation, of less than or equal to such overall-width of such at least one load support) of load-support platform 140 such that the addition of side panels or accessories does not increase the width of cart.

Figure 8:
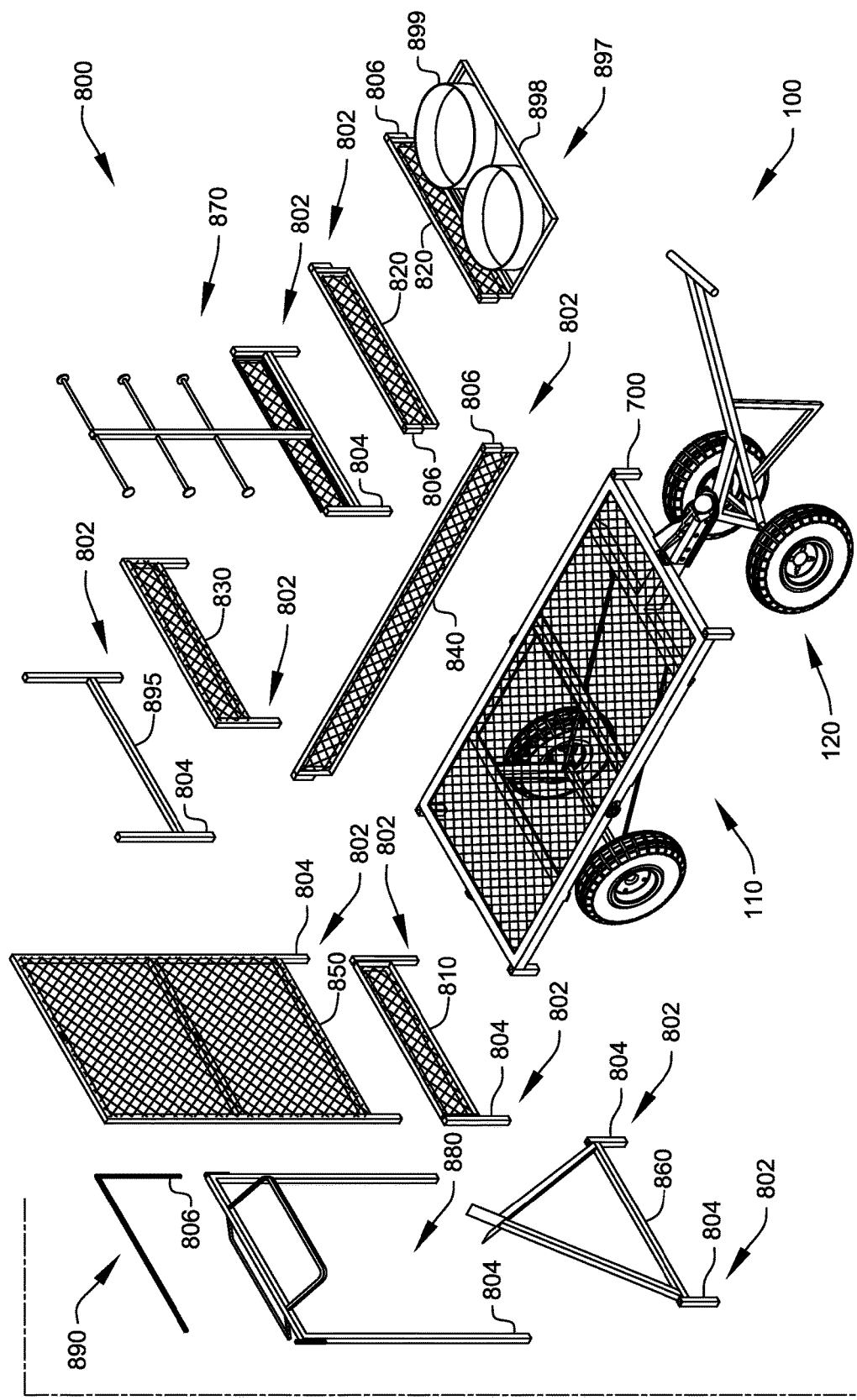
FIG. 8 shows an exploded view illustrating a variety of possible accessories for the cart according to the preferred embodiment of FIG. 1.

FIG. 8 shows an exploded view illustrating a variety of possible accessories 800 for the cart 110 according to the preferred embodiment of FIG. 1. Ultimate cart dolly system 100 is structured and arranged to allow the ability to carry very heavy loads efficiently while remaining compact enough for safe use by a single user. Additionally, ultimate cart dolly system 100 is structured and arranged to allow the addition of accessories 800 to cart 110 in order to accommodate a variety of different kinds of loads which may be needed for a variety of different trades and commercial uses. Preferably, ultimate cart dolly system 100 comprises accessories 800. Preferably, accessories 800 comprise metal construction, preferably steel construction, preferably heavy gauge steel construction, which is similar to that of cart 110 and dolly 120. Preferably, accessories 800 all comprise mounts 802, as shown. Preferably, mounts 802 comprise about ¾ inch by about ¾ inch square tube construction allowing insertion into mount receiver 700. Preferably, mounts 802 comprise primary mounts 804 and secondary mounts 806. Primary mounts 804 are structured and arranged to allow for insertion of mount 804 into mount receivers 700 of cart 110, as shown. Secondary mounts 806 are structured and arranged to allow for interlacing insertion into other accessories via primary mounts 804 (See FIG. 7).

Accessories 800 preferably further comprise short-side-panel 810 (at least embodying herein at least one side-upright structured and arranged to mount on at least two accessory mount points and enclose at least one side of such at least one load support; and at least embodying herein at least one two of such at least one side-uprights structured and arranged to mount on a common mount point of such at least two mount points and enclose at least two sides of such at least one load support). Short-side-panel 810 comprises primary mounts 804 which allow insertion into mount-receivers 700 along short side 610 of load-support platform 140 of cart 110. Short-side-panel 810 further comprises open ends at the top of primary mounts 804 which allow for the ability to stack additional accessories 800 atop short-side-panel 810 by interlacing inserting secondary mounts 806 of other accessories 800 into to the top of primary mounts 804 of short-side-panel 810 (see FIG. 7).

Accessories 800 preferably further comprise short-side-panel 830. Short-side-panel 830 comprises primary mounts 804 which allow insertion into mount-receivers 700 along short side 610 of load-support platform 140 of cart 110. Short-side-panel 830 comprises primary mounts which are closed at the top, so no other accessories 800 can be stacked above short-side-panel 830.

Accessories 800 preferably further comprise short-side-panel 820. Short-side-panel 820 preferably comprises secondary mounts 806 which allows for interlacing inserting secondary mounts 806 of short-side-panel 820 into the primary mounts 804 of another accessory (see FIG. 7) along the short side 610 of load-support platform 140 of cart 110.

Accessories 800 preferably further comprise long-side-panel 840. Long-side-panel 840 preferably comprises secondary mounts 806 which allow interlacing insertion into primary mounts 804 of other accessories 800 along long side 620 of load-support platform 140 of cart 110.

Accessories 800 preferably further comprise oversized-short-side-panel 850. Oversized-short-side-panel 850 preferably comprises primary mounts 804 which allow insertion into mount-receivers 700 on load-support platform along short side 610.

Oversized-short-side-panel preferably comprises a size that is similar to the size of load-support platform 140 of cart 110. The addition of greatly extended ends (oversized-short-side-panels 850) to cart 110 allows for a user to stack several layers of supplies, like rolls of carpeting or other materials which are rolled, onto cart 110 in such a way that the high sides (oversized-short-side-panels 850) will aid in containing the rolls on the cart 110.

Accessories 800 (at least embodying herein such at least one accessory selected from the accessory group consisting of at least one saddle rack structured and arranged to support at least one saddle; at least one spool support structured and arranged to support a spool of material; at least one cylinder support structured and arranged to support cylindrical equipment) preferably further comprise A-frame 860. A-frame 860 preferably comprises triangular shaped frame with a V-shaped notch atop the triangle, as shown. A-frame preferably further comprises primary mounts 804 allowing for insertion of A-frame along short side 610 of load-support platform 140 of cart 110. A user would insert an A-frame 860 at each end of cart 110 along short side 610 and then each end of a steel rod can be placed into the V-shaped notch at the top of A-frame 860. This accessory can be used to load (or hang) a very large industrial spool of material onto cart, by placing the rod through the spool and then "hanging" the rod onto the A-frames 860.

Accessories 800 preferably further comprise accessory-tree 870. Accessory-tree 870 comprises a tree shaped construction and primary mounts 804 allowing for insertion into mount receivers 700 along short side 610 of load-support platform 140 of cart 110. Accessory tree allow for a user to "hang" various types of supplies (like smaller spools of materials) onto cart 110 while leaving room on load-support platform 140 for larger materials.

Accessories 800 preferably further comprise saddle rack 880. Saddle rack 880 comprises an upside down u-shaped frame construction with two angled-horizontal u-shaped attachments attached to the horizontal bar at the top of the u-shaped frame for supporting a saddle. Saddle rack 880 can be inserted into mount receivers 700 along the short side 610 of load-support platform 140 of cart 110. Saddle rack 880 further comprises a secondary mount receiver 808 at the top corners of the frame.

Accessories 800 preferably further comprise accessory-rod 890. Accessory-rod 890 preferably comprises an L-shaped rod comprising secondary mount 806 which allows interlacing insertion of L-shaped rod 890 into the primary mounts 804 of other accessories 800 along short side 610 of cart 110. A user can insert accessory-rod 890 into the secondary mount receivers 808 of saddle rack 880 which would provide a place to "hang" additional items of tack or blankets or saddle pads onto cart 110.

Accessories 800 preferably further comprise end-blocks 895. End-blocks 895 preferably comprise "goal-post" shaped construction and primary mounts 804 which allows for insertion of end-block 895 along short side 610 of load-support platform 140 of cart 110. A user can insert end-blocks 895 onto short sides 610 of cart 110, and then interlacing insert long-side-panel 840 along long sides 620 of cart 110 which would allow for materials loaded onto cart 110 to be held in on the sides but leaves room for items to protrude out the ends of cart 110.

Accessories 800 preferably further comprise bucket-rings 897. Bucket-retaining-ring-frame 897 preferably comprises a short-side-panel 820 which is welding attached to a horizontal frame 898 with at least one metal ring 899, preferably at least two metal rings 899 welding attached to it, as shown. Bucket-retaining-ring-frame 897 preferably further comprises secondary mounts 806 allowing for bucket-retaining-ring-frame 897 to be inserted into the mount receivers 700 along the short side 610 of load-support platform 140 of cart 110. A user can attach bucket-retaining-ring-frame 897 to cart 110 and then place buckets (5-gallon sized buckets) of paint or other materials into the rings. This will allow prevention of movement or tipping of buckets upon transport of cart 110 across uneven surfaces.

Figure 9:
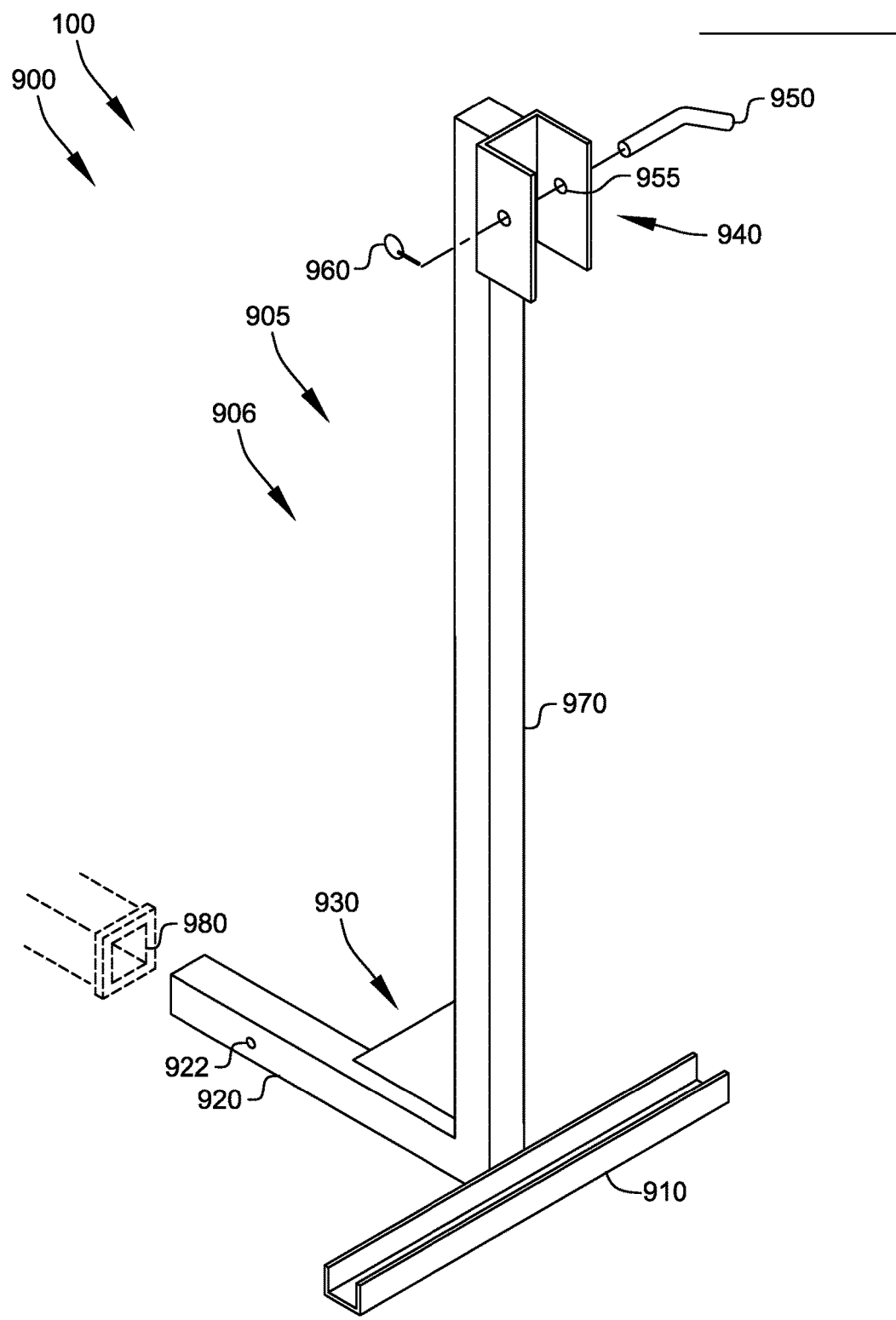
FIG. 9 shows a side view illustrating a transport rack for the cart and dolly according to the preferred embodiment of FIG. 1.

FIG. 9 shows a side view illustrating a transport rack 900 (at least embodying herein at least one tow rack structured and arranged to rack such at least one load support, such at least one front roller and such at least one rear roller, fully assembled, on at least one tow hitch of at least one road-vehicle) for the cart 110 and dolly 120 of ultimate cart dolly system 100, according to the preferred embodiment of FIG. 1. Ultimate cart dolly system 100 preferably comprises transport-rack 900. The present invention is designed such that it is compact enough for use, transport, loading and unloading by a single user. Consequently, due to its compact size, ultimate cart dolly system 100 can be transported to the site of use in a variety of different ways, for example it can be transported on a flat-bed trailer, inside a utility van, in the bed of a pick-up truck, etc. However, the present invention preferably further comprises transport rack 900 which is structured and arranged to allow for transport of ultimate cart dolly system 100 attached to the outside of a transport vehicle. Transport rack 900 can be attached to a vehicle of any kind using a standard hitch system.

Transport rack 900 preferably comprises metal construction, preferably steel construction, preferably heavy gauge steel construction. Transport rack 900 preferably comprises transport-rack support 905. Transport-rack support 905 preferably comprises about 2½ inch by about 2½ inch tube formed in an L-shape 906. Transport-rack support 905 preferably comprises horizontal hitch-extension base 920, load-support-platform track 910, vertical arm 970, coupler-clamp 940, and reinforcing-plate 930. Coupler-clamp preferably comprises clamp-pin 950 and securing lock 960.

The lower horizontal portion of L-shape 906 comprises horizontal hitch-extension base 920. Horizontal hitch-extension base comprises pin-receiver 922 which allows for transport rack to be locked into place on a vehicle hitch using a standard trailer safety pin. Horizontal hitch-extension base 920 is inserted into the receiving opening 980 of a vehicle hitch and secured in place with a standard trailer safety pin which is locked into place with a cotter pin (not shown). Horizontal hitch-extension base 920 comprises a length to allow transport-rack 900 to extend away from the vehicle far enough so as not to impede the ability of a user to open a tailgate or doors of the transport vehicle when cart 110 and dolly 120 are loaded onto transport rack.

The vertical portion of L-shape 906 comprises vertical arm 970. Vertical arm 970 comprises load-support-platform track 910. Load-support-platform track comprises u-track welding attached to the base of vertical arm 970 on the opposite side as horizontal hitch-extender portion of L-shape 906, as shown. Vertical arm 970 preferably further comprises coupler-clamp 940. Coupler-clamp 940 preferably comprises about 3 inch u-track welding attached to the top of vertical arm 970 on the same side as load-support-platform track. Coupler-clamp further comprises coupler-lock receiver 955 comprising holes drilled into coupler-clamp 940 to allow a standard ⅝ inch safety pin 950 and lock 960 to be placed through coupler-clamp 940, as shown. Lock 960 preferably comprises cotter pin, preferably split pin cotter pin, preferably about 3/32 inch by 1½ inch split pin cotter pin. Upon reading the teachings of this specification, those skilled in the art will now appreciate that, under appropriate circumstances, considering such issues as design preference, user preferences, marketing preferences, cost, structural requirements, available materials, etc., other materials, such as, for example, any other type of cotter pin, locking snap, locking carabineer, pad lock etc., may suffice.

Transport rack 900 further comprises reinforcing-plate 930 comprising a triangular plate which is welding attached within the 90 degree angle at the base of L-shape 906. Reinforcing-plate 930 is structured and arranged to add additional strength and support to transport rack 900 when cart 110 and dolly 120 are loaded into transport rack 900.

Figure 10A:
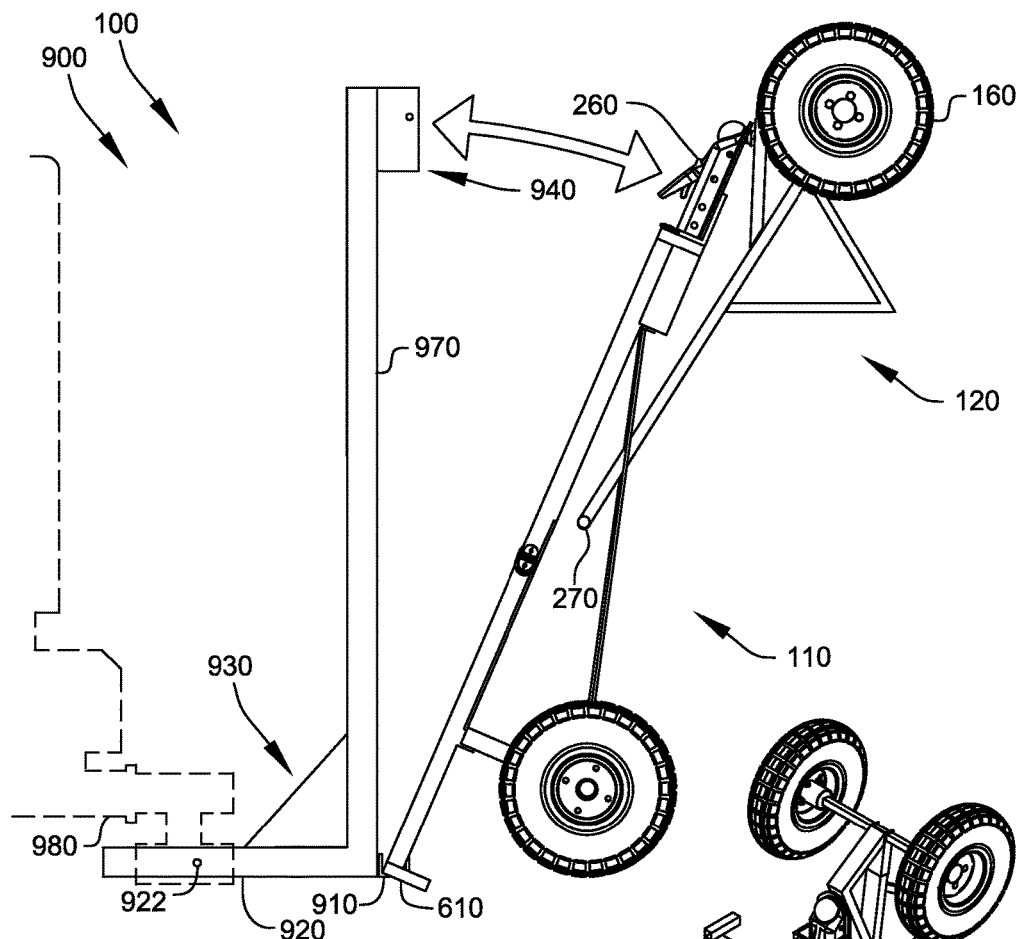
FIGS. 10A and 10B show a side elevational view illustrating the loading or unloading of the cart and dolly onto the transport rack according to the preferred embodiment of FIG. 1.
Figure 10B:
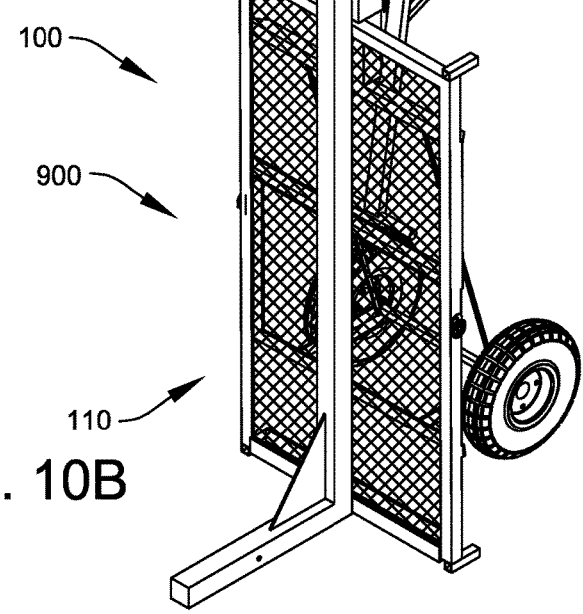

FIGS. 10A and 10B show a side elevational view illustrating the loading or unloading of the cart and dolly onto the transport rack according to the preferred embodiment of FIG. 1. To load cart 110 and dolly 120 onto transport rack 900, short side 610 of load-support platform at the loading end 210 of cart is placed into load-support-platform track 910 of transport rack 900, with dolly 120 attached. Load-support platform should be facing adjacent vertical arm 970 and wheels 160 should be facing away from the transport vehicle. Cart 110 and dolly 120 are then tipped upward and coupler 260 of cart 110 is inserted into coupler-clamp 940. Coupler 260 is then secured within coupler-clamp 940 by inserting safety pin 950 through coupler-clamp 940 and coupler 260. Safety pin 950 is then locked into place with lock 960. Once cart 110 is secured in place with coupler 260 within coupler-clamp 940, dolly 120 is turned 180 degrees such that wheels 160 of dolly 120 are pointed up into the air and handle 270 is tucked inside the underside 605 of load-support platform 140, as shown. If a user needs to make sure that there is enough clearance above the road for transport rack or to make sure that cart 110 and dolly 120 do not protrude too high behind the transport vehicle, a dual hitch extension can be used to raise or lower the height of cart 110 and dolly 120 behind the vehicle, like for example a Reese Towpower Dual Hitch Extension, as shown.

Figure 11:
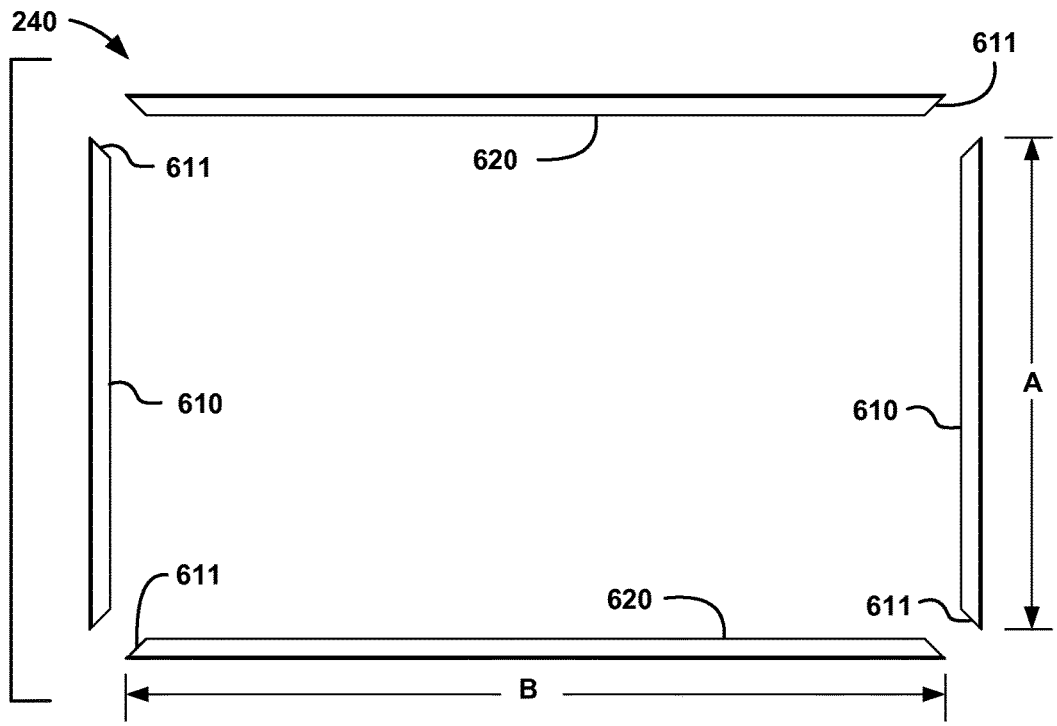
FIG. 11 shows an exploded plan view illustrating the parts of the support platform for the cart according to the preferred embodiment of FIG. 1.
Figure 12:
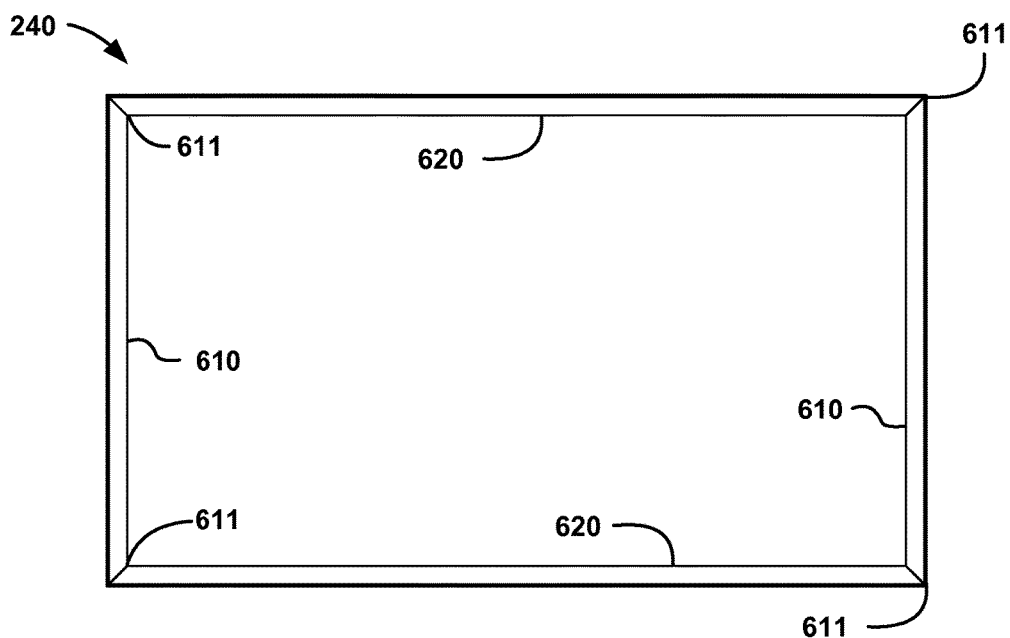
FIG. 12 shows a plan view illustrating the parts of the support platform for the cart placed together according to the preferred embodiment of FIG. 1.
Figure 13:
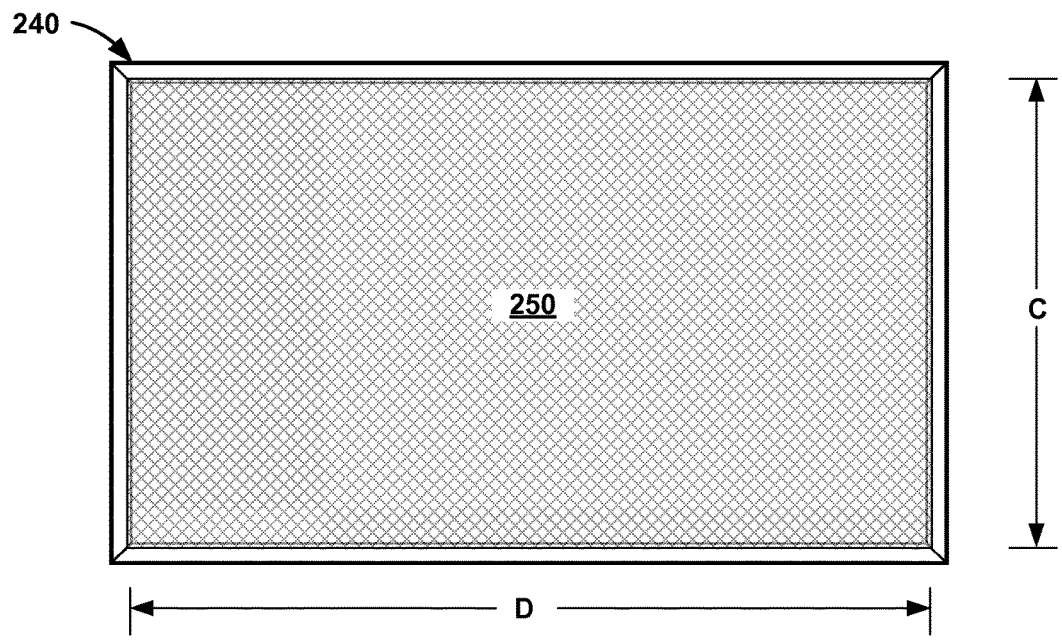
FIG. 13 shows a plan view illustrating the addition of the support sheet part of the support platform according to the preferred embodiment of FIG. 1.

FIG. 11 shows an exploded plan view illustrating the parts of the support platform for the cart according to the preferred embodiment of FIG. 1. FIG. 12 shows a plan view illustrating the parts of the support platform for the cart placed together according to the preferred embodiment of FIG. 1. FIG. 13 shows a plan view illustrating the addition of the support sheet part of the support platform according to the preferred embodiment of FIG. 1.

The method of assembling cart 110 of ultimate cart dolly system 100 begins with cutting two long sides 620 and two short sides 610. Each end of each long side 620 and each short side 610 are cut at a 45 degree angle to form terminal angle 611 (See FIG. 11). Each terminal angle 611 of each long side 620 is welded to a terminal angle 611 of a short side 610 to form rectangular frame 240 (See FIG. 12). The corners are secured to each other by welding them inside and out. Next support sheet 250 is cut, placed inside rectangular frame 240 with the rough edge facing up and all edges are welded on the inside (See FIG. 13).

Figure 14:
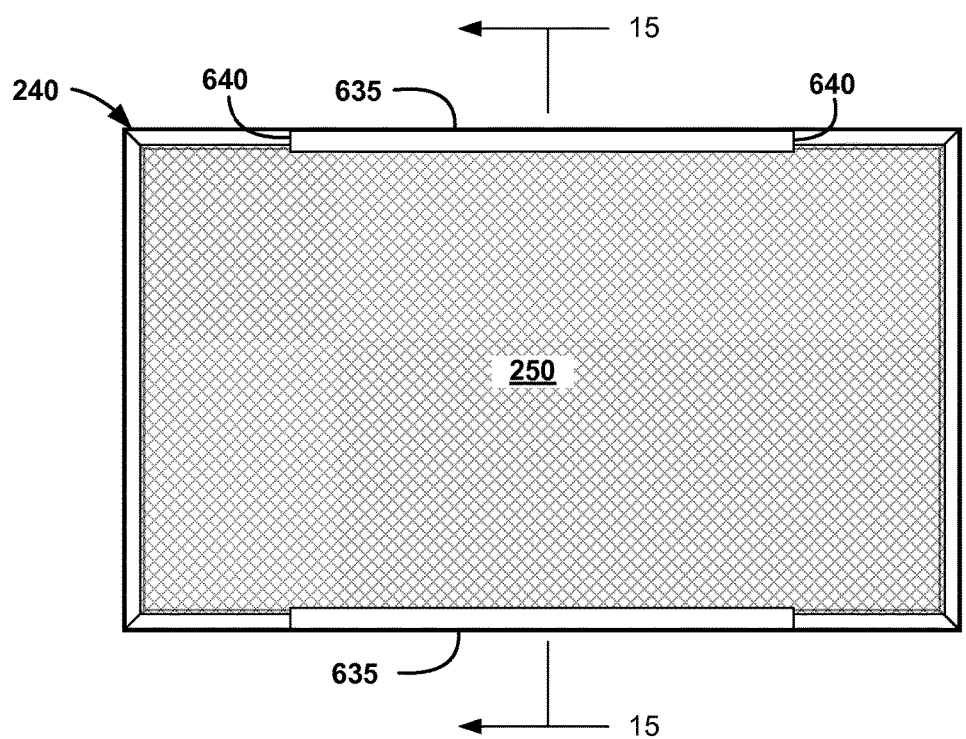
FIG. 14 shows a plan view of the support platform illustrating placement of the support sides of the reinforcing-support structure according to the preferred embodiment of FIG. 1.
Figure 15:
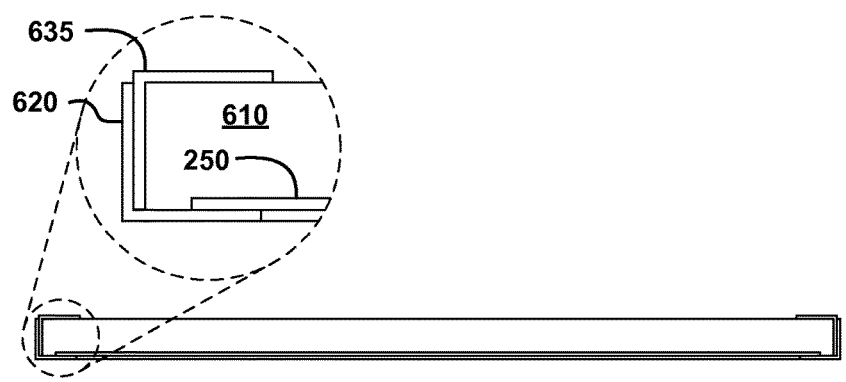
FIG. 15 shows the sectional view 15-15 of FIG. 14.
Figure 16:
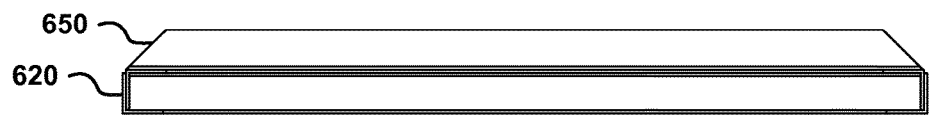
FIG. 16 shows a plan view of the support platform illustrating placement of the support crossbeams of the reinforcing-support structure according to the preferred embodiment of FIG. 1.
Figure 17:
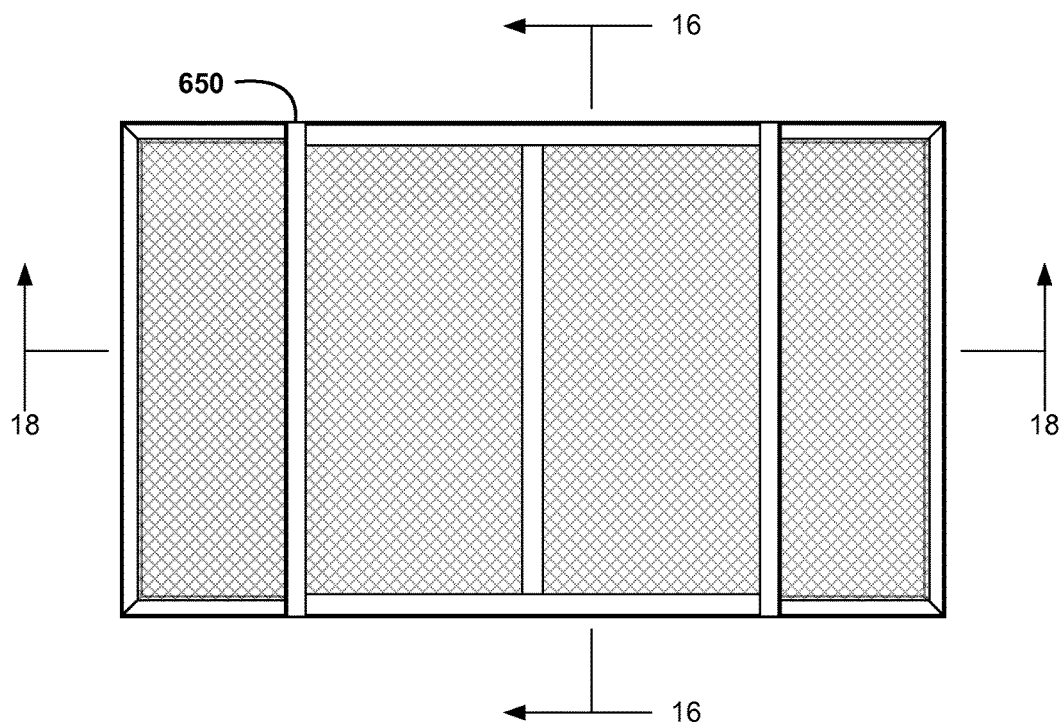
FIG. 17 shows the sectional view 17-17 of FIG. 16.
Figure 18:
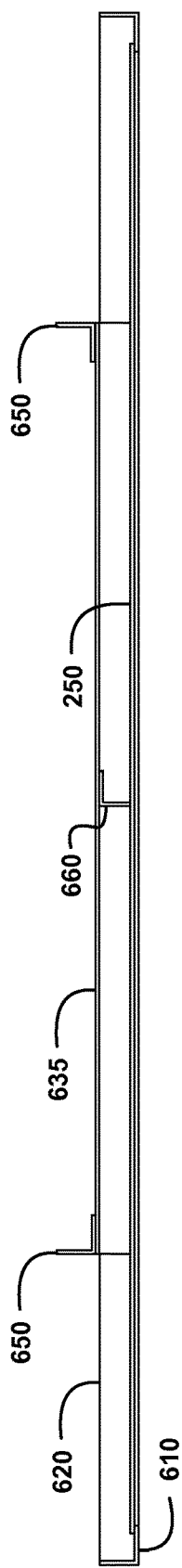
FIG. 18 shows the sectional view 18-18 of FIG. 16.

FIG. 14 shows a plan view of the support platform illustrating placement of the support sides of the reinforcing-support structure according to the preferred embodiment of FIG. 1. FIG. 15 shows the sectional view 15-15 of FIG. 14. FIG. 16 shows a plan view of the support platform illustrating placement of the support crossbeams of the reinforcing-support structure according to the preferred embodiment of FIG. 1. FIG. 17 shows the sectional view 17-17 of FIG. 16. FIG. 18 shows the sectional view 18-18 of FIG. 16.

To assemble the reinforcing-support structure, cut four reinforcing-support sides 635. Cut the ends of two of the reinforcing support sides 635 at a 45 degree angle to form the two terminally-angled sides 650. The other two remain with square ends for the terminally-squared-end sides 640. Now each terminally-square-end side 640 is placed, onto the underside of the rectangular frame 240 with the angled edge facing down into the rectangle. Terminally-square-end sides 640 should be positioned such that they are centered along the long side 620 and their ends terminate 10 inches from the end of rectangular frame 240 (See FIG. 14 and FIG. 15). The two terminally-angled sides 650 are then placed onto the rectangular frame 240 at the ends of the terminally-square-end sides 640 with the angled edges facing the outside of rectangular frame 240. Additionally, place crossmember support 645 with square ends in between terminally-squared-end sides 640 centered on long side 620 of frame 240. Weld all edges together and to rectangular frame 240 (See FIG. 14 and FIG. 15).

Figure 22:
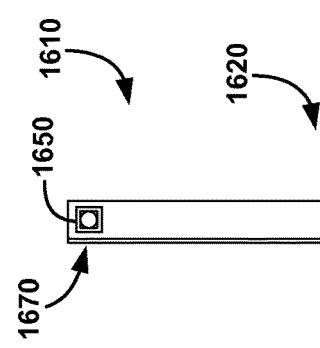
FIG. 22 shows the sectional view 22-22 of FIG. 21.
Figure 20:
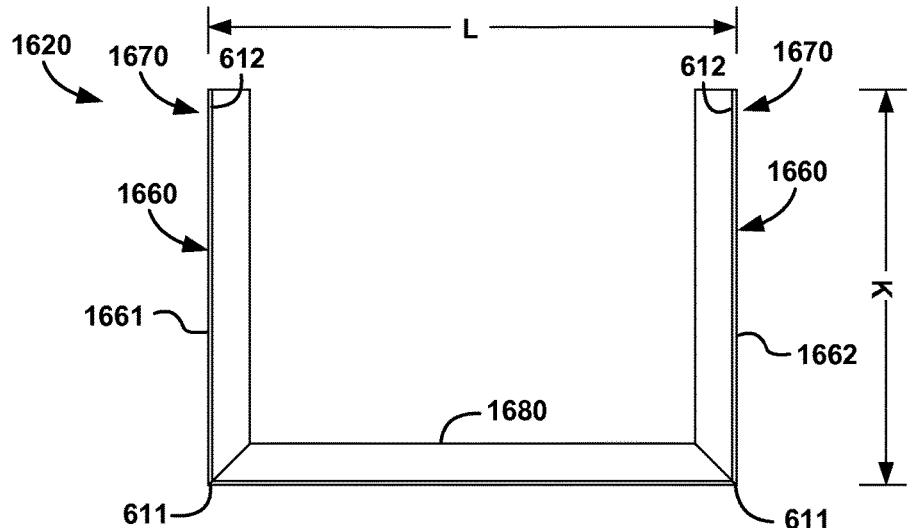
FIG. 20 shows a plan view of load-stabilizing axle frame according to the preferred embodiment of FIG. 1.
Figure 21:
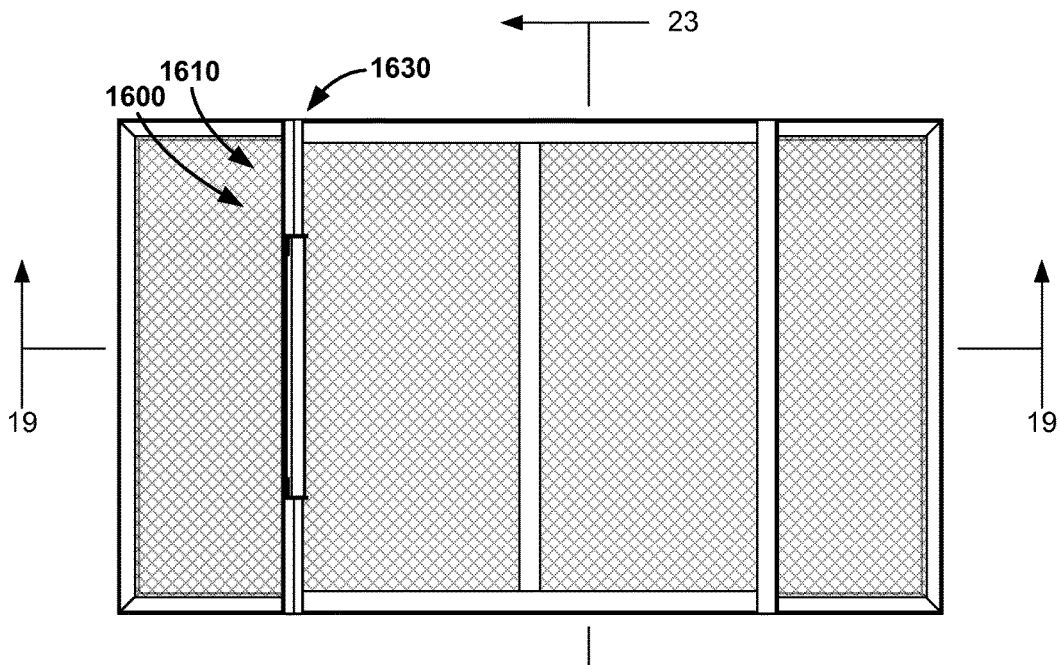
FIG. 21 shows a plan view illustrating the load-support platform with the reinforcing-support structure and load-stabilizing axle attached according to the preferred embodiment of FIG. 1.
Figure 23:
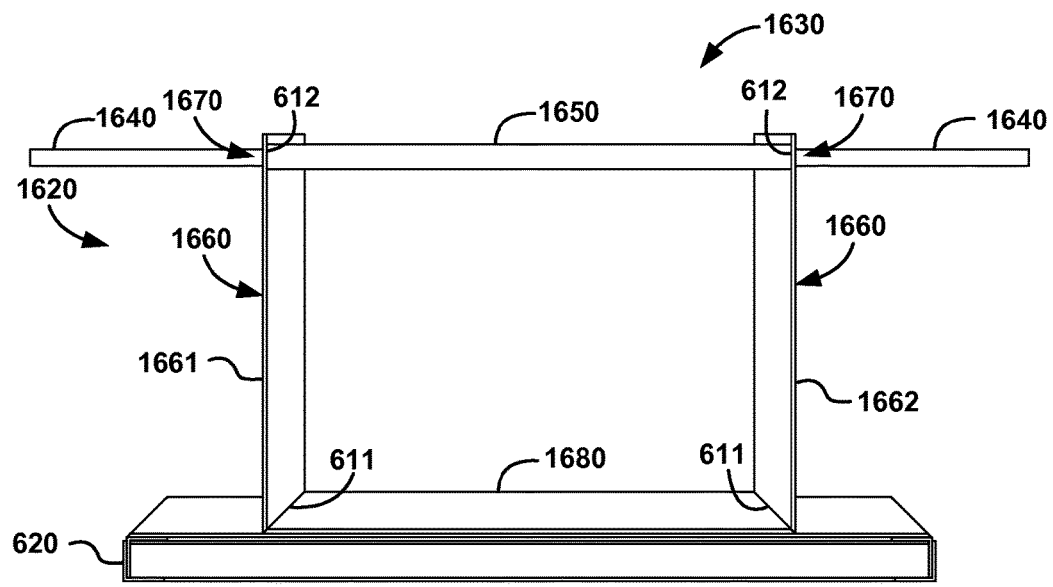
FIG. 23 shows the sectional view 23-23 of FIG. 21.

FIG. 19 shows a plan view of the axle assembly according to the preferred embodiment of FIG. 1. FIG. 20 shows a plan view of load-stabilizing axle frame according to the preferred embodiment of FIG. 1. FIG. 21 shows a plan view illustrating the load-support platform with the reinforcing-support structure and load-stabilizing axle attached according to the preferred embodiment of FIG. 1. FIG. 22 shows the sectional view 22-22 of FIG. 21. FIG. 23 shows the sectional view 23-23 of FIG. 21.

The next step is to construct the load-stabilizing axle 1600. Form load-stabilizing axle frame 1610 from two 1¼ inch by 1¼ inch 12 inch lengths of angle iron and one 16 inch length. Cut a 45 degree end on each end of the 16 inch length and one end of each 12 inch length (opposite angles). Form a u-shape (FIG. 20) joining each cut end of the 12 inch lengths to the ends of the 16 inch length. Drill 1 inch holes (612 and 612') for the axle. Axel assembly 1630 comprises a 30 inch length of ⅝ inch rolled steel inside a 16 inch ¾ inch by ¾ inch hammered square tube (centered) and welded. Axel assembly 1630 is then inserted into holes (612 and 612') in axel-assembly receiver 1670 and welded in place. Load-stabilizing axle 1600 is places as shown in FIG. 21 centered in frame 240.

Figure 24:
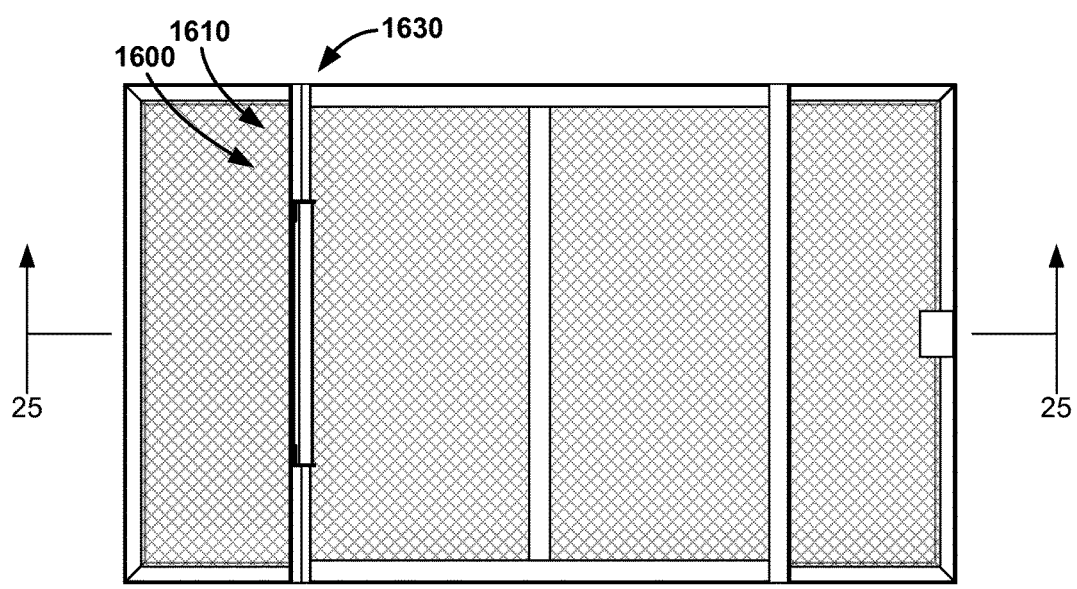
FIG. 24 shows a plan view of the load-support platform with the coupler-reinforcer attached according to the preferred embodiment of FIG. 1.
Figure 25:
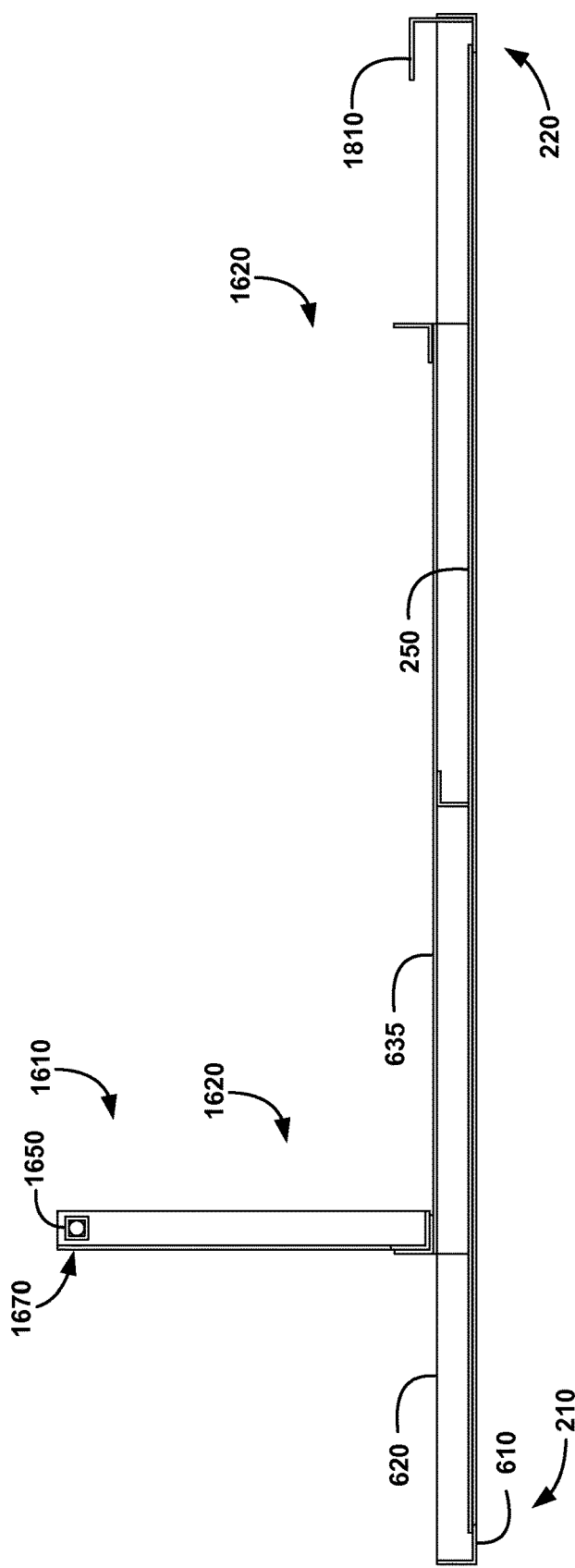
FIG. 25 shows sectional view 25-25 of FIG. 24.

FIG. 24 shows a plan view of the load-support platform with the coupler-reinforcer attached according to the preferred embodiment of FIG. 1. FIG. 25 shows sectional view 25-25 of FIG. 24. FIG. 26 shows a plan view of load-support platform with the coupler and the load-stabilizing reinforcers attached according to the preferred embodiment of FIG. 1. FIG. 27 shows sectional view 27-27 of FIG. 26.

Next, coupler-reinforcer 1810 is inserted and welded centered on short side 610 with the angle facing the rear of the cart. Weld a 2½×2½×13 inch square tube (coupler extender 1820) inside the trailer coupler (1832) with a 2 inch receiver and 2-/12 inch shaft. Place receiver assembly as shown in FIG. 26 and weld in place.

Figure 28:
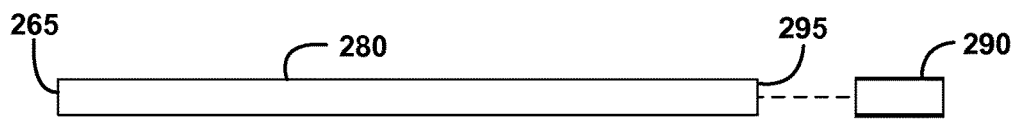
FIG. 28 shows a plan view of the parts to assemble the axle end of the dolly arm according to the preferred embodiment of FIG. 1.

FIG. 28 shows a plan view of the parts to assemble the axle end of the dolly arm according to the preferred embodiment of FIG. 1. Assemble two load stabilizing reinforcers 170 as shown in FIG. 26 and FIG. 27.

Figure 29:
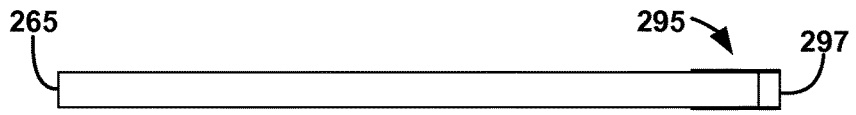
FIG. 29 shows a plan view of the axle end of the dolly arm assembled according to the preferred embodiment of FIG. 1
Figure 30:
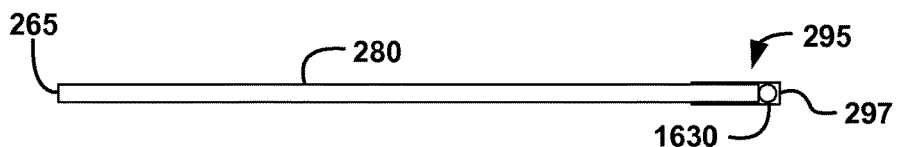
FIG. 30 shows a plan view of the placement of the axle into the axle end of the dolly according to the preferred embodiment of FIG. 1.
Figure 31:
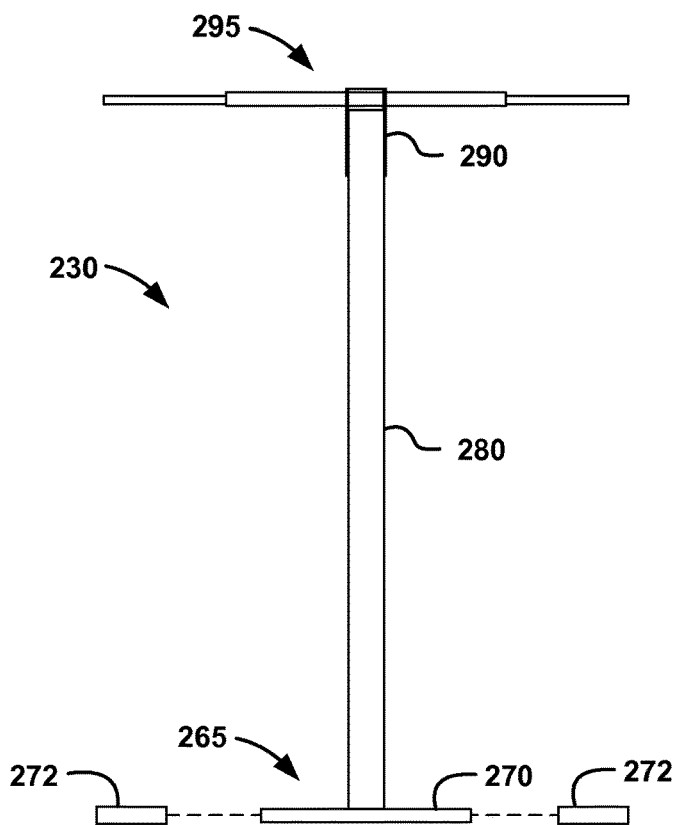
FIG. 31 shows a top view of the dolly frame assembled with the axle attached to the axle end and the handle attached to the handle end of the dolly arm according to the preferred embodiment of FIG. 1.
Figure 32:
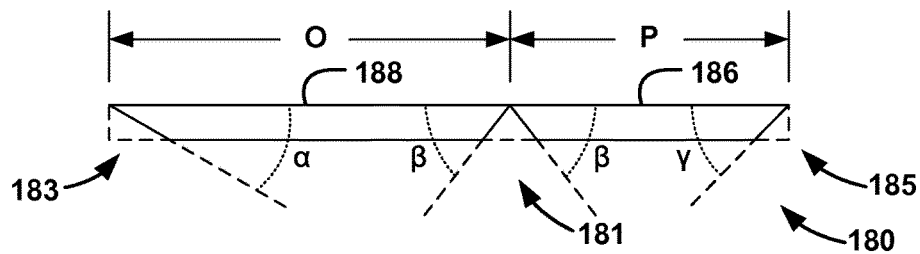
FIG. 32 shows a side view of coupling riser indicating the cuts and angles required to form coupling riser according to the preferred embodiment of FIG. 1.
Figure 33:
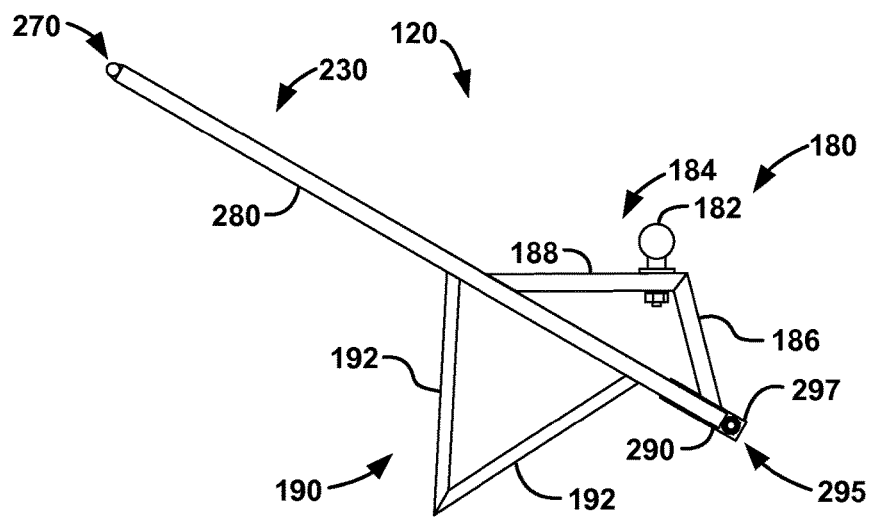
FIG. 33 shows a side view of the assembled dolly according to the preferred embodiment of FIG. 1.
Figure 34:
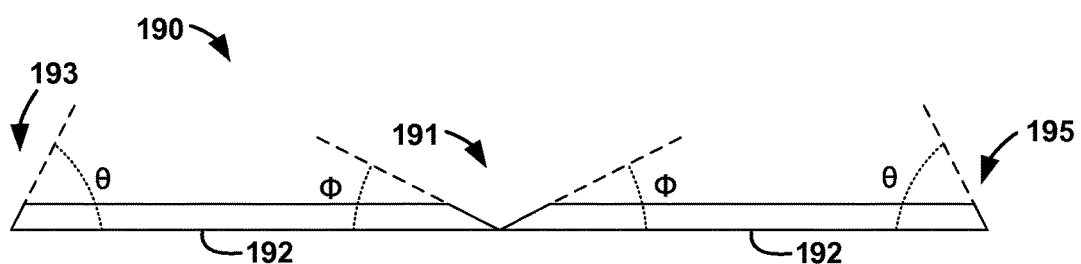
FIG. 34 shows a side view of rest indicating the cuts and angles required to form rest according to the preferred embodiment of FIG. 1.

FIG. 29 shows a plan view of the axle end of the dolly arm assembled according to the preferred embodiment of FIG. 1. FIG. 30 shows a plan view of the placement of the axle into the axle end of the dolly according to the preferred embodiment of FIG. 1. FIG. 31 shows a top view of the dolly frame assembled with the axle attached to the axle end and the handle attached to the handle end of the dolly arm according to the preferred embodiment of FIG. 1. FIG. 32 shows a side view of coupling riser indicating the cuts and angles required to form coupling riser according to the preferred embodiment of FIG. 1. FIG. 33 shows a side view of the assembled dolly according to the preferred embodiment of FIG. 1. FIG. 34 shows a side view of rest indicating the cuts and angles required to form rest according to the preferred embodiment of FIG. 1.

Assembly of Dolly 120 proceeds with arm 280 and arm attacher 290 welded as shown in FIG. 28. Next drill holes through axel track 297 as shown in FIG. 30. Insert axel assembly 1630 into axel track 297 as shown in FIG. 31. In addition, weld handle 270 to handle end 265 of arm 280, as shown in FIG. 31. Handle covers 272 preferably slide onto handle 270 after completing the assembly of welded parts.

To form coupling riser 180 and rest 190, each is preferably formed from a single length of hammered steel tubing, notched and folded as follows.

Regarding FIG. 32, coupling riser 180 preferably comprises 2 inches by 1 inch and a length of about 19½ inches. Coupling riser 180 is preferably notched to provide a length O of about 11½ inches as horizontal platform side 188 and a length P of about 8 inches as vertical platform side 186. Notch 181 preferably comprises an angle β of about 52 degrees. Additionally, horizontal platform side 188 preferably comprises and an angled end 183 preferably comprising an angle α of about 30 degrees. Further vertical platform side 186 preferably comprises an angled end 185 preferably comprising an angle γ of about 46 degrees. Coupling riser 180 preferably is welded to arm 280 where angled end 185 is centered on arm attacher 290 (see FIG. 33).

Regarding FIG. 34, rest 190 preferably comprises ¾ inch square and a length of about 28 inches. Rest 190 is preferably notched to provide an even length of about 14 inches to each rest side 192. Notch 191 preferably comprises and angle Φ of about 27 degrees. Additionally each end 193 of rest 190 preferably comprises an angle θ of about 63 degrees. Rest 190 is preferably welded at about 22 inches from handle 270 (see FIG. 33).

Wheels 160 preferably are attached to each axle assembly 295 sandwiched between washers and held on by wheel-securing lock 150. The inner-most washer in this arrangement is preferably welded into place.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A system, relating to transporting equipment through confined walkways while bearing the weight of the equipment, comprising:
   a) at least one load support structured and arranged to support the equipment;
   b) wherein said at least one load support comprises
      i) a front end,
      ii) a rear end, and
      iii) an overall-width; and
   c) at least one roller structured and arranged to roll said at least one load support over a walkway;
   d) wherein said at least one roller comprises at least one front roller and at least one rear roller located respectively near the front end and the rear end of said at least one load support;
   e) wherein said at least one front roller and said at least one rear roller comprise a common overall-width; and
   f) wherein said common overall-width of said at least one front roller and said at least one rear roller is less than or equal to said overall-width of said at least one load support; and
   g) at least one rear mount structured and arranged to mount said at least one rear roller to said at least one load support; and
   h) at least one front coupler structured and arranged to removably couple said at least one front roller to said at least one load support;
   i) wherein said system bears the weight of the equipment during transport
   j) wherein said at least one front coupler comprises rotational freedom to rotate in three axes; and
   k) wherein said at least one front roller comprises rotational freedom to rotate in three axes; and
   l) at least one accessory mount structured and arranged to mount at least one accessory structured and arranged to aid said at least one load support in supporting the equipment;
   m) wherein said at least one accessory mount comprises exactly four mount points; and
   n) wherein:

i) each said accessory mount point is located at a corner of said at least one load support;
ii) two accessory mount points are located on each said front end and said rear end; and
iii) each pair of said two accessory mount points comprise an overall-width, including separation, of less than or equal to said overall-width of said at least one load support.

2. The system according to claim 1 further comprising at least one handle structured and arranged to permit hand propelling said system.

3. The system according to claim 1 wherein said at least one front coupler comprises at least one ball-hitch coupler.

4. The system according to claim 1 wherein said at least one load support and said at least one rear mount collectively comprise at least one loader structured and arranged to assist loading the equipment onto said at least one load support.

5. The system according to claim 4 wherein said at least one loader comprises at least one leverage transferer structured and arranged to transfer leverage from the front end to said at least one rear roller.

6. The system according to claim 1 wherein said at least one load support further comprises at least one load tie-down coupler structured and arranged to couple with at least one load tie-down.

7. The system according to claim 1 wherein said at least one front roller further comprises at least one trailer mover structured and arranged to assist moving at least one road-trailer structured and arranged to be pulled by at least one road-vehicle.

8. The system according to claim 1 further comprising at least one side-upright structured and arranged to mount on at least two accessory mount points and enclose at least one side of said at least one load support.

9. The system according to claim 8 further comprising at least two of said at least one side-uprights structured and arranged to mount on a common mount point of said at least two mount points and enclose at least two sides of said at least one load support.

10. The system according to claim 1 further comprising such at least one accessory selected from the accessory group consisting of:
   a) at least one saddle rack structured and arranged to support at least one saddle;
   b) at least one spool support structured and arranged to support a spool of material; and
   c) at least one cylinder support structured and arranged to support cylindrical equipment.

11. The system according to claim 1 further comprising at least one tow rack structured and arranged to rack said at least one load support, said at least one front roller and said at least one rear roller, fully assembled, on at least one tow hitch of at least one road-vehicle.

12. A system, relating to transporting equipment through confined walkways while bearing the weight of the equipment, comprising:
   a) at least one load support structured and arranged to support the equipment;
   b) wherein said at least one load support comprises a platform comprising
      i) a front end,
      ii) a rear end, and
      iii) an overall-width; and
   c) at least one roller structured and arranged to roll said at least one load support over a walkway;
   d) wherein said at least one roller comprises at least one axle and at least two wheels;
   e) wherein said at least one roller comprises at least one front roller and at least one rear roller located respectively near the front end and the rear end of said at least one load support;
   f) wherein said at least one front roller and said at least one rear roller comprise a common overall-width; and
   g) wherein said common overall-width of said at least one front roller and said at least one rear roller is less than or equal to said overall-width of said at least one load support; and
   h) at least one rear mount structured and arranged to mount said at least one rear roller to said at least one load support; and
   i) at least one front coupler structured and arranged to removably couple said at least one front roller to said at least one load support;
   j) wherein said at least one front coupler comprises at least one ball-hitch coupler; and
   k) at least one handle structured and arranged to permit hand propelling said system;
   l) wherein said system bears the weight of the equipment during transport;
   m) wherein said at least one front coupler comprises rotational freedom to rotate in three axes; and
   n) wherein said at least one front roller comprises rotational freedom to rotate in three axes; and
   o) at least one tow rack structured and arranged to rack said at least one load support, said at least one front roller and said at least one rear roller, fully assembled, on at least one tow hitch of at least one road-vehicle.

13. The system according to claim 12 wherein said at least one front roller further comprises at least one trailer mover structured and arranged to assist moving at least one road-trailer structured and arranged to be pulled by at least one road-vehicle.

14. A system, relating to transporting equipment through confined walkways while bearing the weight of the equipment, comprising:
   a) at least one load support structured and arranged to support the equipment;
   b) wherein said at least one load support comprises
      i) a front end,
      ii) a rear end, and
      iii) an overall-width; and
   c) at least one roller structured and arranged to roll said at least one load support over a walkway;
   d) wherein said at least one roller comprises at least one front roller and at least one rear roller located respectfully near the front end and rear end of said at least one load support;
   e) wherein said at least one front roller and said at least one rear roller comprise a common overall-width; and
   f) wherein said common overall-width of said at least one front roller and said at least one rear roller is less than or equal to said overall-width of said at least one load support; and
   g) at least one rear mount structured and arranged to mount said at least one rear roller to said at least one load support; and
   h) at least one front coupler structured and arranged to removably couple said at least one front roller to said at least one load support;
   i) wherein said system bears the weight of the equipment during transport;
   j) wherein said at least one front coupler comprises rotational freedom to rotate in three axes; and k) wherein said at least one front roller comprises rotational freedom to rotate in three axes; and
l) further comprising at least one tow rack structured and arranged to rack said at least one load support, said at least one front roller and said at least one rear roller, fully assembled, on at least one tow hitch of at least one road-vehicle.

\* \* \* \* \*